United States Patent [19]
Nagai et al.

[11] Patent Number: 6,092,232
[45] Date of Patent: Jul. 18, 2000

[54] DISK DATA REPRODUCING APPARATUS AND DISK DATA REPRODUCING METHOD

[75] Inventors: Yutaka Nagai, Yokohama; Tomoaki Kudo, Higashi Murayama; Masayuki Hirabayashi, Yokohama; Toshifumi Takeuchi, Tokyo; Hiroyuki Gunji, Hitachinaka, all of Japan

[73] Assignee: Hitachi, Ltd., Tokyo, Japan

[21] Appl. No.: 09/042,659

[22] Filed: Mar. 17, 1998

[30] Foreign Application Priority Data

Mar. 19, 1997 [JP] Japan ................................. 9-066604

[51] Int. Cl.[7] ........................... G11C 29/00; G11B 27/36
[52] U.S. Cl. ........................ 714/769; 714/770; 714/774; 369/47; 369/60; 369/62
[58] Field of Search ..................... 714/768, 769, 714/770, 771–775; 369/44.11, 44.17, 44.26, 44.28, 47, 50, 56, 60–62, 124; 386/100

[56] References Cited

U.S. PATENT DOCUMENTS

| | | | |
|---|---|---|---|
| 5,068,752 | 11/1991 | Tanaka et al. | 386/100 |
| 5,295,130 | 3/1994 | Tobita et al. | 369/124 |
| 5,602,812 | 2/1997 | Miura et al. | 369/48 |
| 5,712,836 | 1/1998 | Kamoto et al. | 369/50 |
| 5,841,938 | 11/1998 | Nitta et al. | 386/111 |

FOREIGN PATENT DOCUMENTS

| | | |
|---|---|---|
| 5-250804 | 9/1993 | Japan . |
| 6-89506 | 3/1994 | Japan . |

*Primary Examiner*—Emmanuel L. Moise
*Attorney, Agent, or Firm*—Beall Law Offices

[57] ABSTRACT

A disk data reproducing apparatus and a disk data reproducing method for carrying out error correction at fixed intervals independent of demodulation rate fluctuations caused by variable disk revolutions during access, whereby the reliability of error correction is improved. Data are demodulated by use of a regenerative clock signal acquired in keeping with the input data rate, whereas error correction is conducted at a fixed frequency clock signal. Two counters are provided, one being incremented by a signal generated upon detection of a block top, the other counter being incremented by a signal generated when a block of erroneous data is corrected. The two computers are compared in contents so that depending on the result of the comparison, an error correction start signal is generated. Error correction is performed always at fixed intervals regardless of the velocity of reproduction being standard, doubled, quadrupled, or multiplied by a factor of j (j: natural number). Error correction, performed on the fixed frequency clock signal, takes shorter than data demodulation through reproduction at a maximum linear velocity. Thus even if data cannot be read, error correction proceeds irrespective of the demodulation anomalies so that error correction is performed reliably.

22 Claims, 29 Drawing Sheets

BLOCK STRUCTURE

ID STRUCTURE

ID STRUCTURE AT BLOCK TOP

DISK DATA REPRODUCING APPARATUS AND DISK DATA REPRODUCING METHOD

BACKGROUND OF THE INVENTION

The present invention relates to an apparatus and a method for reproducing data from an optical disk having digital signals recorded thereon.

Known disk data reproducing apparatuses include compact disk (CD) players. Disk type storage media such as CDs generally have their data recorded by what is known as the constant linear velocity (CLV) method to maximize their recording density. The disk type medium with its data recorded by the CLV method differs in revolving speed between the innermost and the outermost tracks: the speed at the outermost track is about 2.6 times that at the innermost track. During data reproduction, the revolving speed of the medium varies with the pickup moving over the medium surface to read data therefrom. During access to a target position on the disk, the revolving speed varies by a factor of up to 2.6. Given such revolving speed fluctuations, data cannot be reproduced from the disk unless and until a predetermined linear velocity is reached.

The technique disclosed by Japanese Patent Laid-Open No. Hei 5-250804 consists in controlling at a constant angular velocity (CAV) the disk whose data was recorded by the CLV method, with a master clock altered in accordance with the pickup position on the disk surface. One disadvantage of the disclosed technique is structural complexity brought on by the need to install revolving speed detecting means whereby the motor is rotated at a constant velocity.

Japanese Patent Laid-Open No. Hei 6-89506 proposes a method whereby the medium is controlled at a constant linear velocity during normal data reproduction and at a constant angular velocity only during access to specific medium positions. The proposed method requires computing the disk revolutions and the clock frequency based on both the current and the accessed pickup positions, with a clock signal generated according to the computed results. This tends to increase the quantity of computations involved, so much so that the computations sometimes continue beyond the period of an access operation.

Another conventional scheme involves performing demodulation and error correction based on a regenerative clock signal in synchronism with the disk revolutions through the use of a PLL circuit. Under this scheme, a clock signal is reproduced in synchronism with the input data so that the clock signal may be used for demodulation and error correction. The scheme is intended to provide smooth demodulation at access time.

OBJECTS AND SUMMARY OF THE INVENTION

However, the preceding scheme also has its share of disadvantages: scratches or other irregularities on the disk surface can hamper data retrieval, which can destabilize both clock regeneration and demodulation and thereby worsen the reliability of error correction processing.

It is therefore an object of the present invention to provide a disk data reproducing apparatus and a disk data reproducing method which will overcome and improve on the above and other deficiencies and disadvantages of the prior art.

According to the invention, demodulation is carried out using a regenerative clock signal arranged to match the input rate of input data, while error correction is performed based on a fixed frequency clock signal. Two counters are provided. One counter is incremented by a signal generated upon detection of each block top. The other counter is incremented by a signal generated when data is corrected per block. There is provided signal generating means for generating an error correction start signal based on the result from comparing the two counters in content. Error correction is carried out at fixed times that will not change when data reproducing velocity is switched from double to quadruple to j-fold speed (j=natural number).

Other objects, features and advantages of the invention will become more apparent upon a reading of the following description and appended drawings.

DETAILED DESCRIPTION OF PREFERRED EMBODIMENT

Figure 1:
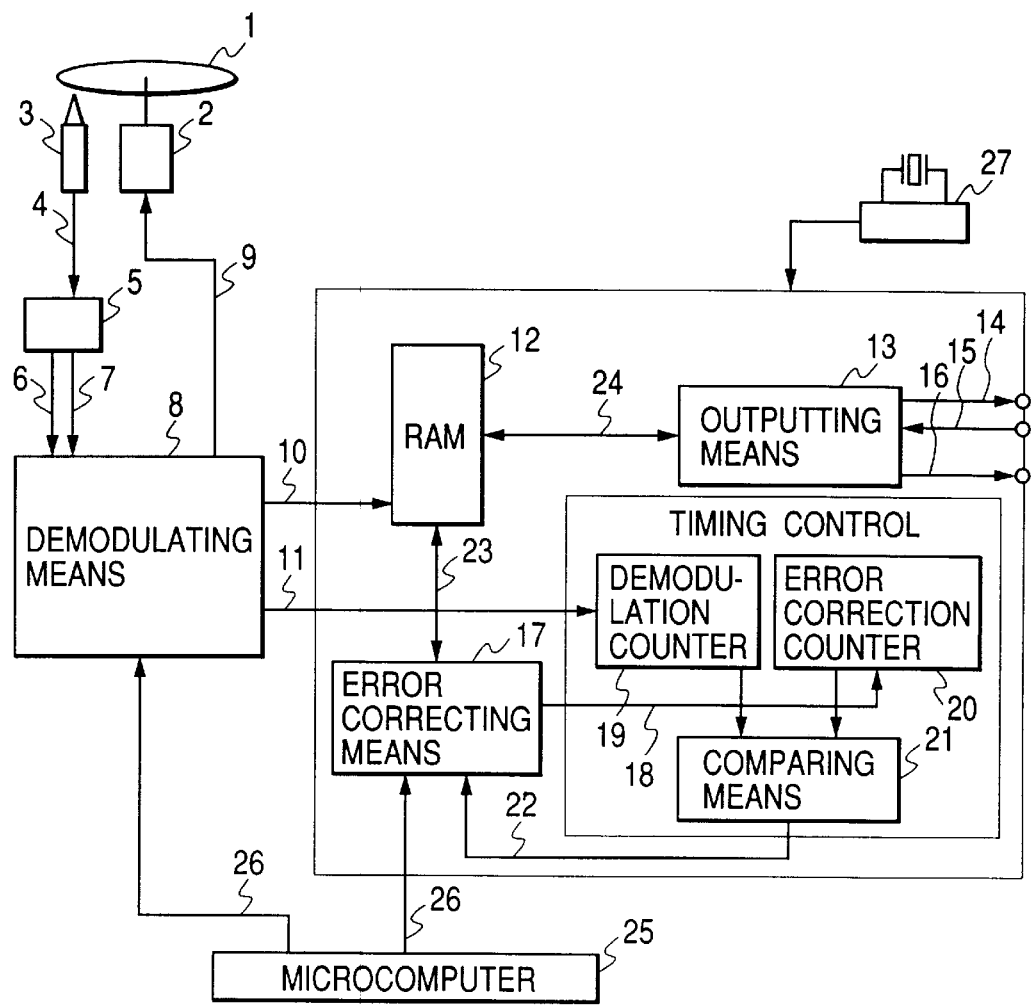
FIG. 1 is a block diagram showing component blocks for error correction.

Preferred embodiments of the disk data reproducing apparatus according to the invention will now be described with reference to the accompanying drawings. In the drawings, reference numeral 1 stands for a disk, 2 for a servo motor, 3 for a pickup, 4 for data, 5 for a PLL circuit, 6 for a regenerative clock signal, 7 for serial data, 8 for demodulating means, 9 for a servo control signal; 10, 16, 23, 24 and 18 for parallel data; 11 for a block top detection signal, 12 for a RAM, 13 for outputting means, 14 for an output OK signal, 15 for a data request signal, 17 for error correcting means, 18 for an error correction end signal, 19 for a demodulation counter, 20 for an error correction counter, 21 for comparing means, 22 for an error correction start signal, 25 for a microcomputer, 26 for an access signal, 101 for synchronism detecting means, 102 for a sync latch timing signal, 103 for a sync flag, 104 for parallel data, 105 for a demodulation circuit, 106 for demodulated data, 107 for intra-sector position detecting means, 108 for a sector address latch timing signal, 109 for an intra-sector position flag, 110 for sector address detecting means, 111 for a sector address, 112 for a sector address state, 113 for a sector address flag, 114 for block top detecting means, 115 for a block top flag, 151 for a sync code, 152 for a position code, 201 for synchronism deciding means, 202 for parallel data, 203 for a synchronism detection signal, 204 for a window counter, 205 for a window counter value, 206 for a window set value, 207 for a decoder, 208 for a window open instruction, 209 for a window close instruction, 210 for window control, 211 for a window, 212 for detection deciding means, 213 for a normal detection signal, 214 for a sync detection set value, 215 for sync detection deciding means, 216 for a continuous detection signal, 217 for sync flag deciding means, 218 for a sync non-detection set value, 219 for sync non-detection deciding means, 220 for a continuous non-detection signal, 221 for sync deciding means, 222 for a sync decision signal, 223 for extrapolation controlling means, 301 for sync code converting means, 302 for a sync code, 303 for a signal indicating whether the converted code is valid or invalid, 304 for intra-sector position detecting means, 305 for a detected position code, 306 for a detected position code valid signal, 307 for a detected position code invalid signal, 308 for position code detection deciding means, 309 for position code non-detection deciding means, 310 for a position code detection set value, 311 for a position code non-detection set value, 312 for a detected position code detection signal, 313 for a detected position code non-detection signal, 314 for an extrapolation counter, 315 for a position code, 316 for a decoder, 317 for an extrapolation counter reset signal, 318 for an intra-sector position flag deciding means, 319 for a sector address latch gate decoder, 401 for sector address deciding means, 402 for a signal indicating the current sector address state, 403 for a signal indicating the preceding sector address state, 404 for a sector address, 405 for a master counter, 406 for a master counter value, 407 for a decoder, 408 for a load signal, 409 for a sector address detection signal, 410 for a sector address non-detection signal, 411 for a sector address detection set value, 412 for a sector address non-detection set value, 413 for sector address detection deciding means, 414 for a load control signal, 415 for an extrapolation counter, 416 for a continuous detection signal, 417 for sector address non-detection deciding means, 418 for a sector address continuous non-detection signal, 419 for flag deciding means, 420 for sector address state deciding means, 421 for a sector address decision control set value, 501 for a block top non-detection set value, 502 for a decision decoder, 503 for a counter, 504 for a counter value, 505 for a select signal, 506 for a reset signal, 507 for a flag control signal, 508 for a selector, 509 for selected data, and 510 for block top flag deciding means.

FIG. 1 is a block diagram of a disk data reproducing apparatus embodying the invention. The ensuing description of this embodiment presupposes the input of data in a format shown in FIGS. 5 and 6.

Figure 5:
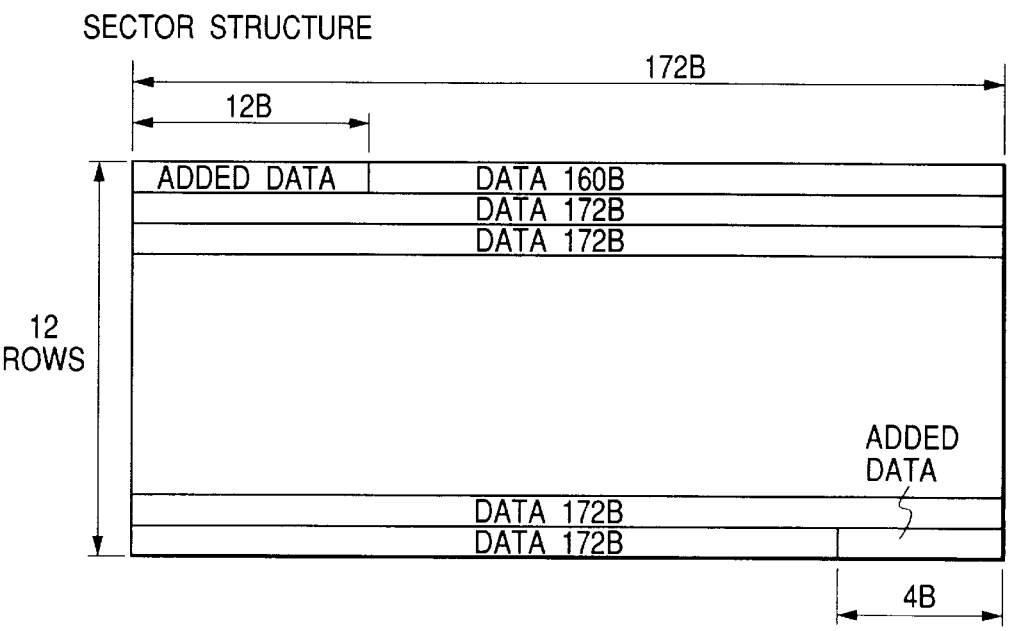
FIG. 5 is a schematic view describing a sector structure of data.
Figure 6:
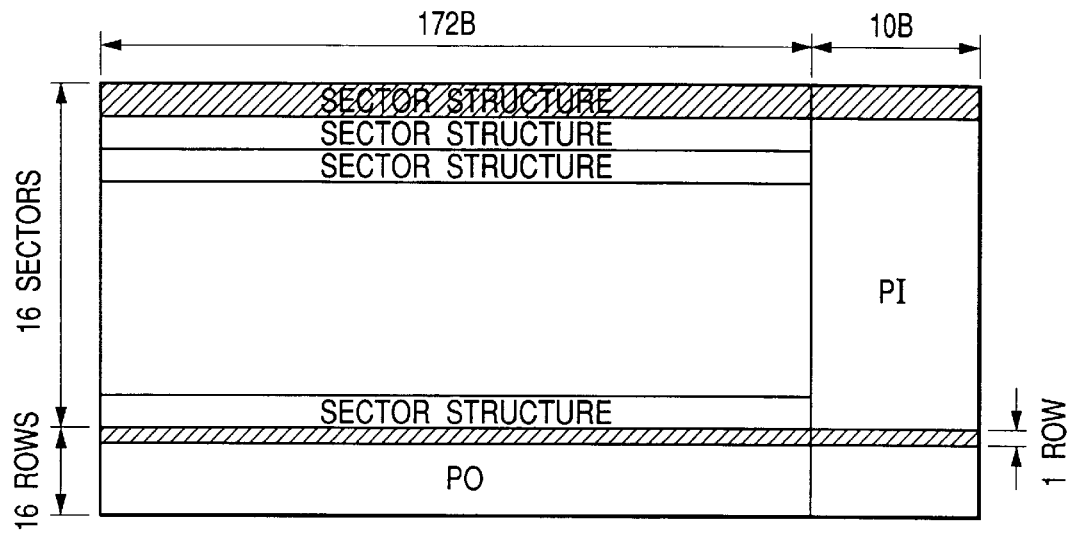
FIG. 6 is a schematic view explaining an ECC block structure of data.

Input data are formatted as follows: as shown in FIG. 5, data entered on a time series basis are divided into units of 2048 bytes each. A main data body is prefixed with added data of 12 bytes and suffixed with added data of 4 bytes. The main data body is divided into units of 172 bytes, each 172-byte unit constituting a data row. Twelve contiguous data rows make up a single sector. Sixteen contiguous sectors constitute a single block. In FIG. 6, reference characters PO denote an error correction signal added to the main data block in the row direction, and PI stand for an error correction signal added to the main data block in the column direction.

The disk data reproducing apparatus of FIG. 1 will now be described. In FIG. 1, reference numeral 1 stands for a disk that is a medium on which data in the format of FIG. 6 are modulated and recorded. A motor 2 rotates the disk 1. A pickup 3 reads data recorded on the disk 1. Reference numeral 4 represents serial data retrieved from the disk 1 by the pickup 3. A PLL circuit 5 generates a clock signal from the serial data 4 in synchronism therewith. The clock frequency varies with the bit rate of the input signal. A signal 6 is the clock signal reproduced by the PLL circuit 5. Reference numeral 7 indicates serial data, and 8 denotes demodulating means for detecting block tops of the serial data 7 and demodulating the blocks. How block tops are detected will be described later with reference to FIG. 7. Reference numeral 9 is a signal for controlling the revolving speed of the motor, 10 is demodulated data, and 11 is a block top detection signal indicating that the top of a single block is detected. A RAM 12 stores input data temporarily. Reference numeral 13 is data outputting means, 14 is a synchronizing clock signal of the data outputting means 13, 15 is a signal for requesting data from the outside, and 16 is a data bus that connects the outputting means 13 with the outside. Reference numeral 17 is error correcting means, 18 is an error correction end signal generated by the error correcting means 17, and 19 is counting means called a demodulation counter for counting the block top detection signal. Reference numeral 20 is counting means called an error correction counter for counting the error correction end signal, and 21 is comparing means for comparing the demodulation counter 19 with the error correction counter 20 in content so as to generate an error correction start signal 22 for output to the error correcting means 17. Reference numeral 23 is a data bus connecting the error correcting means 17 with the RAM 12, and 24 is a data bus connecting the outputting means 13 with the RAM 13. Reference numeral 25 is a microcomputer that controls the entire system, 26 is an access signal generated by the microcomputer 25, and 27 is a crystal oscillator for generating a master clock signal using a crystal resonator arrangement.

What follows is a description of operation clock signals. This disk data reproducing apparatus has two kinds of operation clock signals: a regenerative clock signal and a crystal clock signal. The regenerative clock signal is reproduced from the input data by the PLL circuit 5. The disk 1, motor 2, pickup 3, PLL circuit 5 and demodulating means 8 operate on the regenerative clock signal, whereas the RAM 12, outputting means 13, error correcting means 17, demodulation counter 19, error correction counter 20 and comparing means 21 operate on the crystal clock signal. This signifies that the clock frequency for the disk 1, motor 2, pickup 3, PLL circuit 5 and demodulating means 8 varies with the rate of data read by the pickup 3, while the RAM 12, outputting means 13, error correcting means 17, demodulation counter 19, error correction counter 20 and comparing means 21 operate always at a fixed clock frequency.

The disk has its data recorded by the constant linear velocity (CLV) method so as to enhance its recording density. When the revolving speed of the disk changes, as in an access operation, the input rate rises and falls temporarily and so does the regenerative clock frequency until the revolving speed returns to its initial value at the end of the access. This requires making advance arrangements such that demodulation may proceed in the presence of generative clock frequency fluctuations of up to !^=%. Error correction of each data block is set in advance to terminate before the end of demodulation of a data block at an n-fold seed (n: natural number). Under that setting, the error correction function operates on the crystal oscillated clock signal. This makes it possible to carry out error correction independently of any frequency fluctuations associated with the demodulating operation and more quickly than demodulation.

Figure 2:
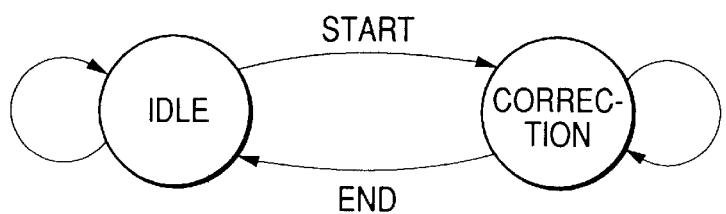
FIG. 2 is a state transition diagram depicting error correction.

How the disk data reproducing apparatus of FIG. 1 works will now be described, starting from the aspect of data input. The pickup 3 reads data from the disk 1. The PLL circuit 5 generates a clock signal in synchronism with the read data. The demodulating means 8 demodulates serial data retrieved from the disk and transfers the demodulated data successively to the RAM 12. When detecting a data block top, the demodulating means 8 sends a block top detection signal to the demodulation counter 19. On detecting the block top detection signal, the demodulation counter 19 has its content incremented. The RAM 12 stores both the data before error correction and the data whose errors have been corrected. Data arrangements inside the RAM 12 will be described later with reference to FIG. 4. FIG. 2 is a state transition diagram depicting how error correction proceeds. The error correcting means remains in a signal input wait state called an idle state as long as error correction is not carried out. If an error correction start signal generated by the comparing means is received in the idle state, the error correcting means 17 reads the demodulated data from the RAM 12 and starts correcting the data for any error. No signal is accepted from the outside while error correction is in progress and, once started, the correcting process continues until all corrected results have been written back to the RAM 12. Error correction is never interrupted halfway. With error correction completed, the idle state is restored. An end to the error correcting process is indicated by generation of an error correction end signal. On detecting the error correction end signal, the error correction counter 20 has its content incremented. The comparing means 21 outputs an error correction start signal if the two values compared have a difference of at least 1 therebetween. The outputting means 13 outputs data whose errors have been corrected. The error correcting means operates on the master clock signal and performs error correction independently of the regenerative clock signal. This signifies that error correction is completed always in a fixed period of time. Once error correction is started on a data block, the correcting process continues uninterrupted until all errors in the block have been corrected.

Figure 3:
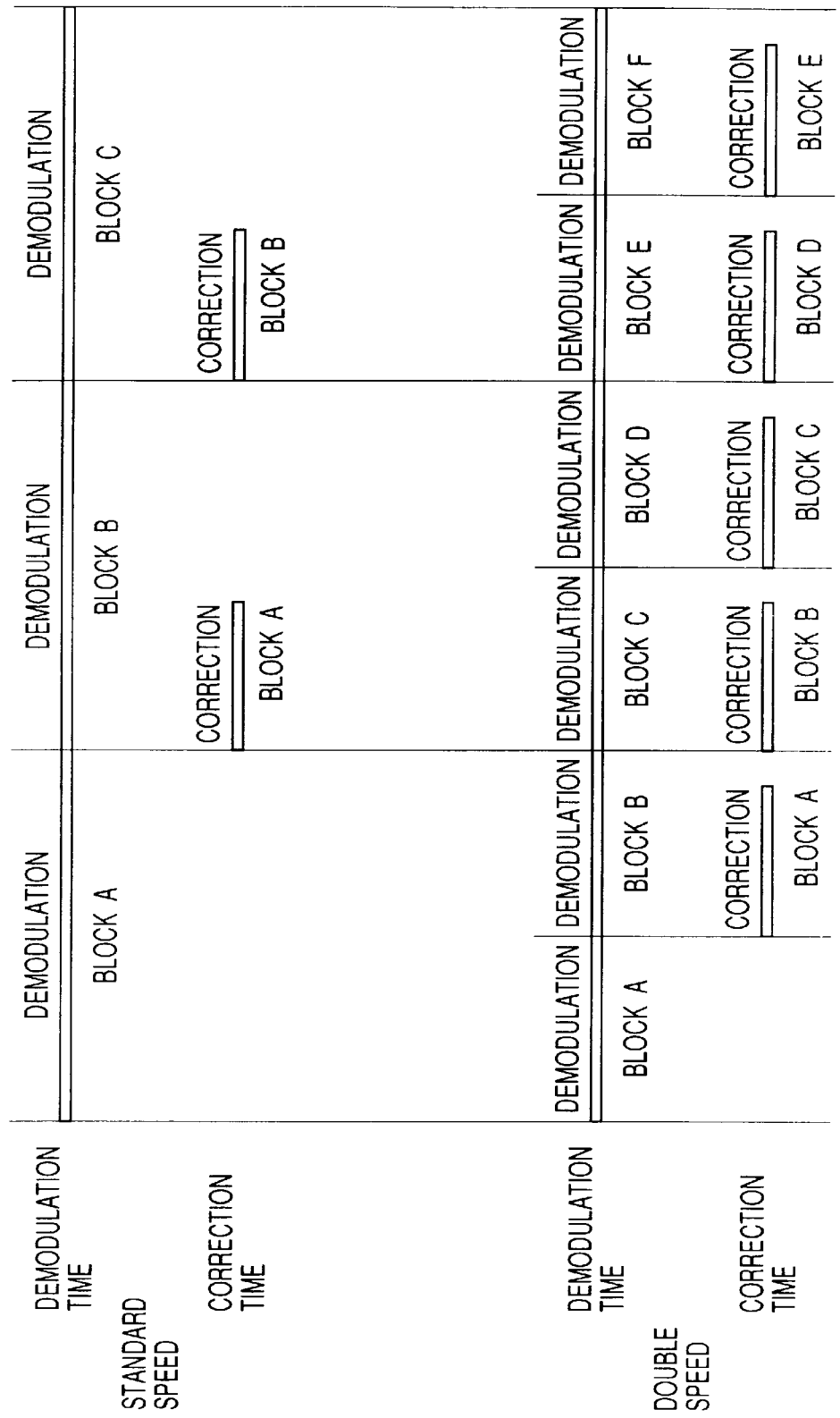
FIG. 3 is a graphic representation illustrating relations between the time it takes to perform demodulation and the time required for error correction at standard and double speeds.

The workings of the disk data reproducing apparatus in FIG. 1, practiced as the first embodiment of the invention, will now be described in more detail. FIG. 3 is a graphic representation illustrating relations between the time required for demodulation and the time for error correction at standard and double speeds. In FIG. 3, each portion marked "DEMODULATION" represents the time it takes to carry out demodulation. A marking "BLOCK A" in the upper part of FIG. 3 denotes the time required to demodulate block A. A marking "CORRECTION" in the middle part of FIG. 3 represents the time required for error correction. A marking "BLOCK A" in the lower part of FIG. 3 indicates the time required to perform error correction of block A. The standard speed is a speed at which data reproduction, demodulation and error correction are carried out at a clock frequency of 27 MHz. The double speed signifies that data reproduction, demodulation and error correction are performed at double the standard speed.

The demodulation of block A is followed by that of block B. The error correction of block A is started simultaneously with the demodulation of block B. That is, when the demodulation of the current block and the error correction of the preceding block have both ended, the demodulation of the next block is started simultaneously with the error correction of the current block, and so on. The processing continues in the same manner at both the standard and the double speed. With demodulation effected at the double speed, the time required to demodulate each block is shortened, but the error correction time remains the same at the double speed as at the standard speed. This is because error correction is effected on the crystal oscillated clock signal. That is, error correction is carried out over a fixed period of time without being affected by the demodulating means. If a linear velocity error of !^50% is permitted for the disk under revolution control at the standard speed, the regenerative clock signal varies up to !^50% in frequency, and the demodulating speed varies accordingly with the clock frequency. Since error correction works on the crystal oscillated clock signal, the correcting process is performed always independently of, and more quickly than, the demodulating process. On the other hand, if a linear velocity error of !^50% is allowed for the disk under revolution control at the double speed, the regenerative clock signal varies up to !^50% in frequency, and the demodulating speed varies accordingly with the clock frequency. If error correction is set in advance to be performed more quickly than an n-fold regenerative clock rate (n: natural number), then error correction is always carried out over a shorter period than demodulation independently of the reproducing speed in effect.

One major advantage of the first embodiment described above is its ability to correct errors of demodulated data even if data destruction on the disk has disabled clock regeneration.

Figure 4:
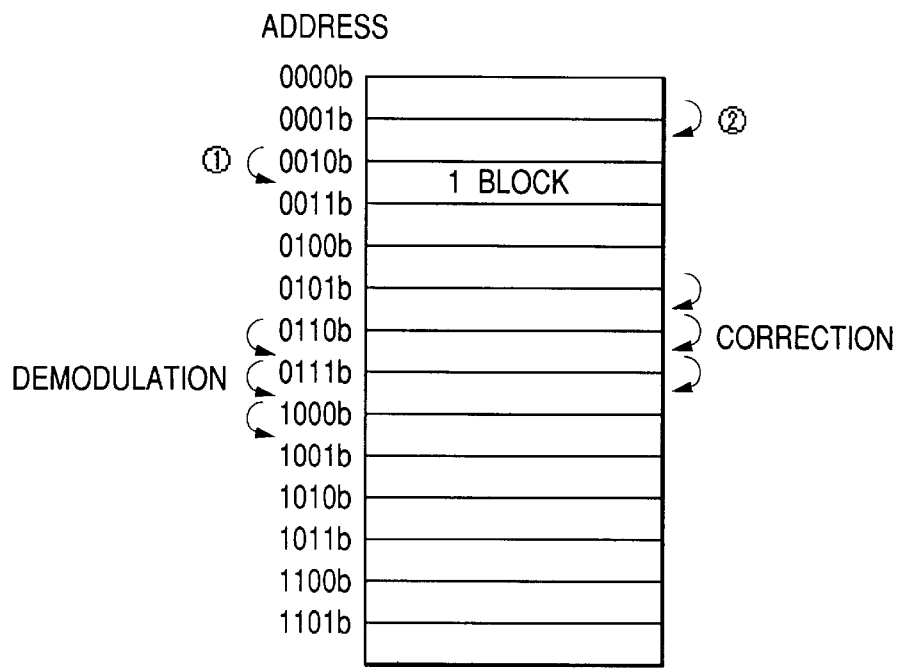
FIG. 4 is a schematic view sketching data arrangements in a RAM.

A second embodiment of the invention will now be described with reference to FIG. 4. FIG. 4 is a schematic view sketching data arrangements in the RAM 12. Data are written to the RAM in units of blocks from the first address on. One block of demodulated data is first written to the RAM.

Concurrently with the start of demodulation and writing of the next block, the error correction of the current block is initiated. The error correction of the demodulated data is started simultaneously with the demodulation of the next data. The processing is repeated so as to write data to the RAM. If no error is found in the data, the data are written unmodified. In case of an error, the erroneous portion is overwritten onto the correct data. When the addresses in the RAM have been exhausted, the write operation is resumed from the first address.

Suppose that the frequency of the regenerative clock signal is temporarily increased by 50% over the normal regenerative frequency illustratively upon access to the disk. If the maximum frequency of the regenerative clock signal is 50% higher than normal, then demodulation proceeds more quickly than error correction. With the demodulated data written so quickly to the RAM, uncorrected data are liable to be overwritten onto newly demodulated data. Thus during demodulation at the double speed with a regenerative clock frequency 50% higher than normal, the demodulating process is halted every time "p" blocks (p; natural number) have been demodulated and written to the RAM.

As described, the second embodiment corrects in a stable manner errors of the data held in the RAM without having to perform all related functions at an elevated speed during a temporarily accelerated reproduction process.

How identification (ID) information is detected by the first embodiment will now be described in detail with reference to FIGS. 5, 6, 7 and 8.

FIG. 5 is a schematic view describing a sector structure of data. In FIG. 5, added data at the top of a sector comprises one-byte sector information, a three-byte sector-specific number (sector address), two-byte parity data (IEC), and six bytes of other data amounting to a total of 12 bytes (indicated as 12B in FIG. 5). Four bytes of data suffixed to the end of the sector are added data for use in error detection. The one-byte sector information and the three-byte sector address are regarded hereunder as ID information. Markings "DATA" stand for main data primarily composed of recorded data. On the storage medium, data are written from the top row to the bottom and from left to right in each row. All data sectors are provided with sector-specific numbers (sector addresses). A sector is the unit constituting an error block.

FIG. 6 is a schematic view of a block structure of data. Each data row comprises 172 bytes of data. One byte of data in the same position in each row constitutes a 16-byte PO code. One byte of data in the same position in the added data, in the main data, and in 208-byte data of each PO code row constitutes an additional 10-byte PI code. That is, each group of 16 sectors is furnished with a PO code of 16×172 bytes and a PI code of 208×10 bytes.

Figure 7:
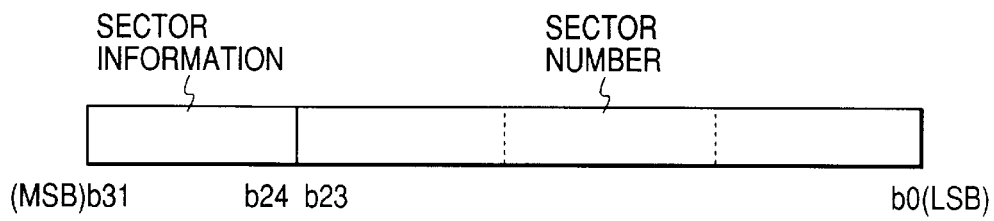
FIG. 7 is a schematic view showing a data ID structure.

FIG. 7 is a schematic view of a detailed ID structure. The ID information comprises one-byte sector information and a three-byte sector number. The sector number is a number (sector address) specific to each sector indicating where the sector in question is located when counted from the beginning of data. The sector address is incremented by 1 starting from the data top.

Figure 8:
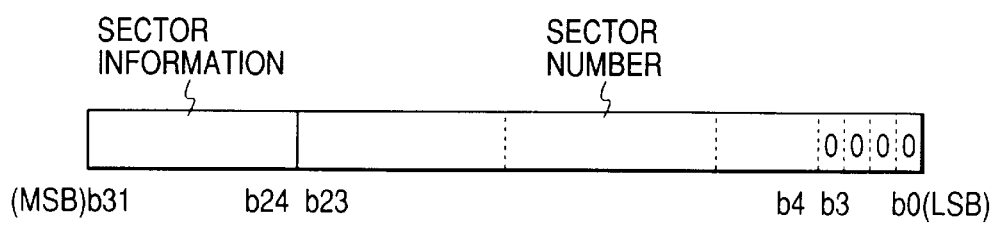
FIG. 8 is a schematic view indicating a block top ID structure of data.

FIG. 8 is a schematic view of a block top ID structure of data. Sixteen contiguous sectors from the beginning of data make up one block. It follows that the sector address of the block top has its least significant bit always set to 0000b in binary notation.

How the block top is detected will now be described. The demodulating means checks to see, for each bit, whether a continuous input signal pattern constitutes a synchronizing signal of a pattern based on predetermined criteria. On detecting a synchronizing signal, the demodulating means obtains therefrom the position of a sector address and detects that sector address. Because sector addresses are continuous about sector data read continuously from the disk, if continued sector addresses are found to be more numerous than a predetermined number from the microcomputer and if the least significant bit of a given sector address is 0000b, then the demodulating means decides the sector in question to be the block top. If a defective sector address or synchronizing signal makes it impossible to read the current sector address, the demodulating means interpolates the current address from the preceding sector address. If the number of interpolated sector addresses exceeds a value predetermined by the microcomputer, the sector address in question will not be decided to be a block top even if the low-order four bits of the sector address are 0000b.

The above scheme, when adopted, allows block tops of only normal data to be detected and an error correction start signal to be generated accurately.

The internal workings of the demodulating means will now be described in more detail. The ensuing description presupposes the input of data in the format shown in FIG. 11.

Figure 11:
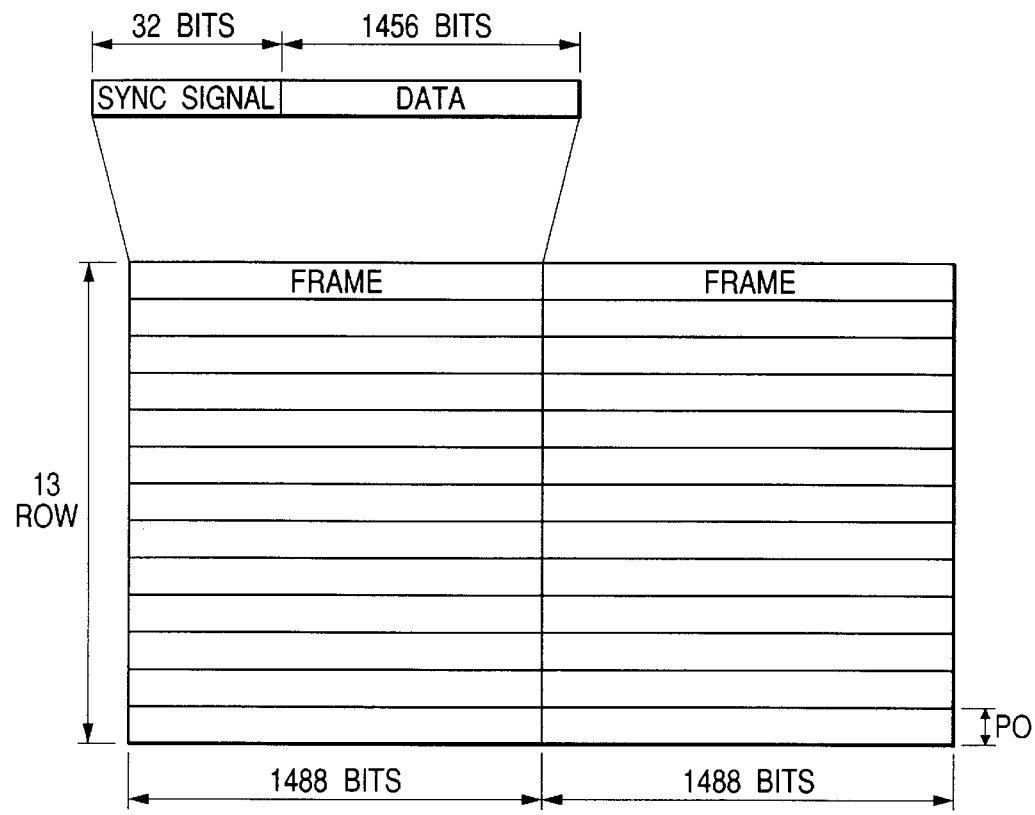
FIG. 11 is a schematic view depicting a format of a block subjected to eight-fourteen modulation and supplemented by a synchronizing signal.

The input data are formatted as follows: FIG. 11 shows how the shaded portions of the data in FIG. 6 are subjected to eight-sixteen demodulation. Each group of 182-byte data is supplemented by a 32-bit synchronizing signal, whereby a frame of 1488 bits is formed. The high-order 16 bits of the synchronizing signal include eight codes (0–7) and the low-order 16 bites comprise a predetermined set of signals.

Figure 12:
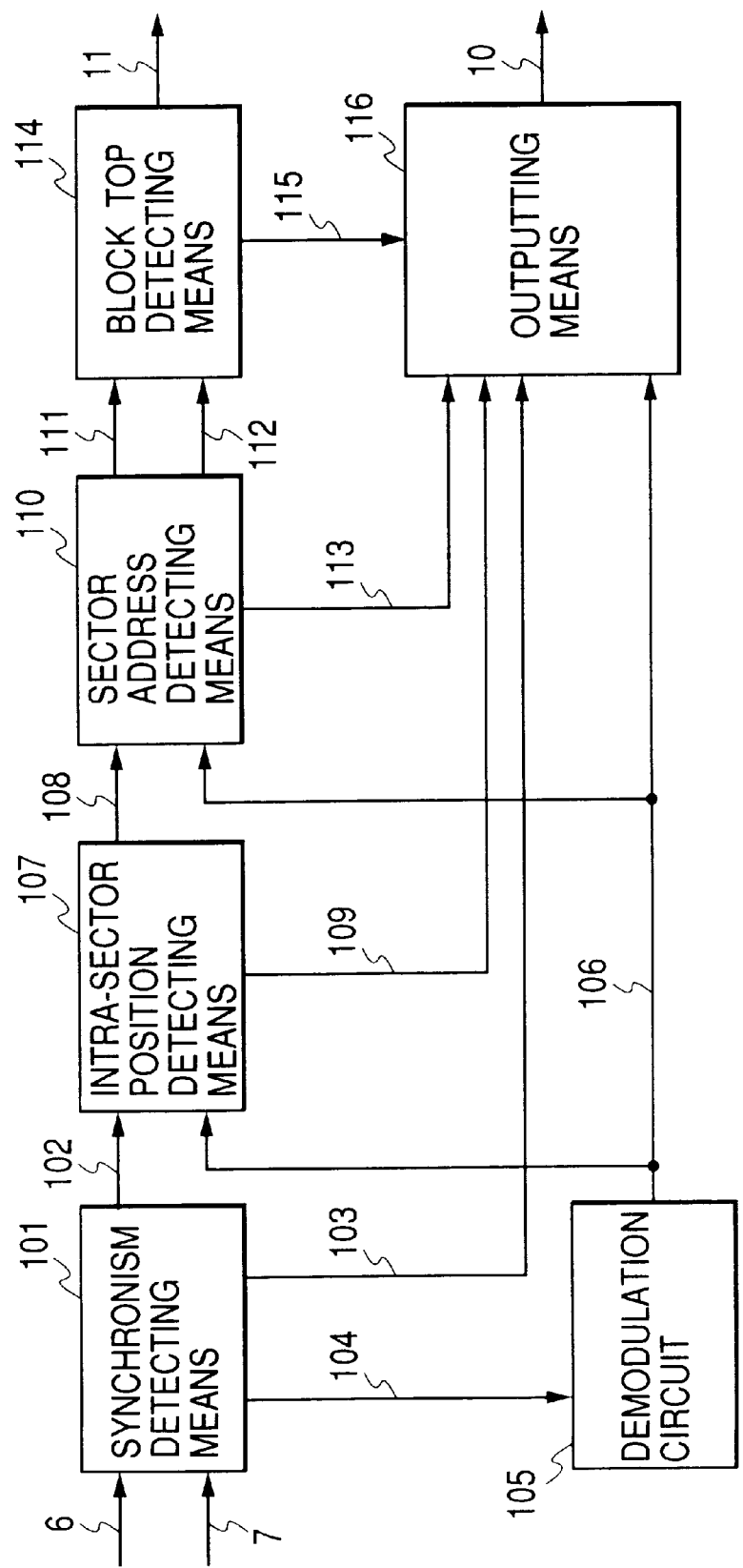
FIG. 12 is a block diagram of demodulating means.

FIG. 12 shows a typical constitution of the demodulating means 8 in the disk data reproducing apparatus of FIG. 1. In FIG. 12, synchronism detecting means 101 detects the synchronizing signal shown in FIG. 11 and, upon detecting the signal, generates a sync latch timing signal 102. Reference numeral 103 is a sync flag indicating a synchronism detection state, 104 is parallel data derived from the serial-to-parallel conversion by the synchronism detecting means 101, 105 is a demodulation circuit that performs demodulation based on the eight-sixteen modulation rule, and 106 is demodulated data. Intra-sector position detecting means 107 operates on the basis of the sync latch timing signal 102 generated by the synchronism detecting means 101, extracting the synchronizing signal from the demodulated data 106 and generating an internal signal sync code accordingly. Furthermore, the intra-sector position detecting means 107 detects an intra-sector position code from the sync code, finds a sector top from the detected position code, and generates a sector address latch timing signal 108. Reference numeral 109 represents an intra-sector position flag indicating a position code detection state. Sector address detecting means 110 detects sector addresses based on the sector address latch timing signal 108. Reference numeral 111 is a sector address detected by the sector address detecting means 110, and 112 is a sector address state indicating the presence or absence of any sector address error (0 for the presence of an error in the sector address, 1 for the absence thereof). Reference numeral 113 denotes a sector address flag indicating a sector address detection state. Block top detecting means 114 detects a block top by deciding the detected sector address 111 and sector address state 112. Reference numeral 11 is a block top detection signal, 115 is a block top flag indicating a block top detection state, and 116 is outputting means for effecting output control. How output control is carried out will be described later. Data transfer is enabled when the sync flag 103, intra-sector position flag 109, sector address flag 113, and block top flag 115 are all zero. If any one of these flags is 1 but no error is included in the preceding data, data transfer is made possible; if an error is found in the preceding data, data transfer is inhibited. If any one of the above flags is 2, data transfer is disabled. The disabled transfer of data is enabled when all flags are again set to zero. In the description that follows, the flag values represent the respective data transfer states mentioned above.

Figure 13:
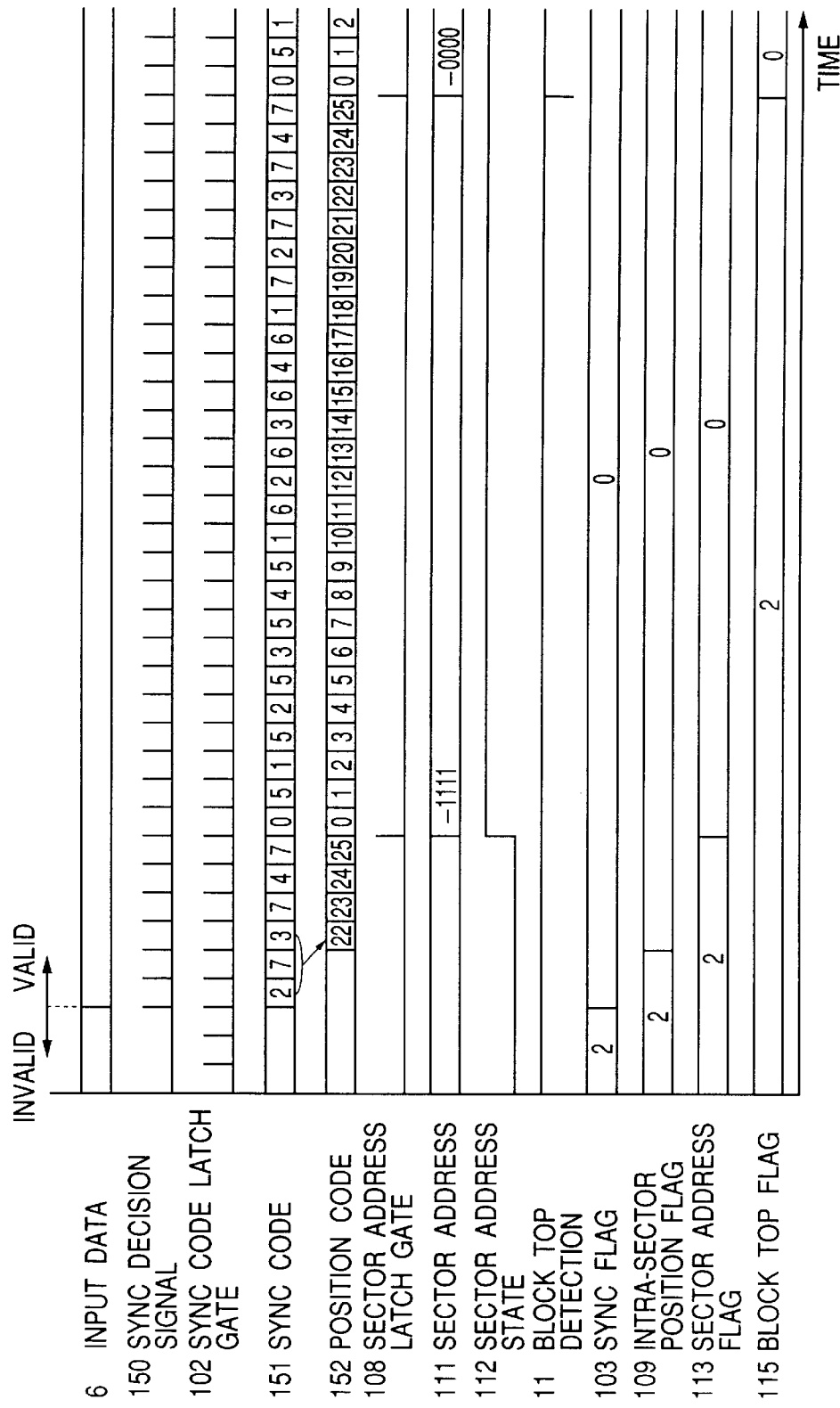
FIG. 13 is a timing chart of signal processing effected by the demodulating means.

The workings outlined above will now be described with reference to the timing chart of FIG. 13. The timing chart summarizes the above operations of demodulation. When the synchronism detecting means 101 detects a predetermined number of consecutive synchronizing signals (one signal, in the example of FIG. 12), the sync flag 103 is brought to 0 from 2. Given the synchronizing signal, the intra-sector position detecting means 107 generates a sync code 151, one of its internal signals. The sync code 151 is assumed to be assigned to each frame as shown in FIG. 13. The frame is divided (into 26 parts in FIG. 13) in units of suitably continuous sync codes 151 (in three continuous sync codes 151 in FIG. 13). The intra-sector position detecting means 107 generates a position code 152, another of its internal codes indicating the position of each divided frame part. A typical scheme for generating the position code 152 is described below. Sync codes 151 each take one of eight values 0 through 7. For every three continuous frames in the 26 frames making up each sector, there is no identical combination of the sync codes 151. In the example of FIG. 13 where three continuous sync codes 151 are illustratively 2, 7 and 3, the corresponding position code 152 is arranged to decode 22. This makes it possible to assign a position code 152 to each frame. The values of every three continuous sync codes 151 represent a single frame position, so that duplication of position codes 152 is averted. The above scheme for generating the position codes 152 indicating frame positions is not limitative of the invention and other schemes may be employed instead. For example, every two continuous sync codes 151 may be used as the basis for generating a position code 152, wherein three continuous sync codes 151 are decided for values only if they are found to be duplicate.

When a larger-than-predetermined number of continuous values are detected, the intra-sector position flag 109 is brought to 0 from 2. If the intra-sector position flag 109 is set to 0 indicating a sector top, the sector address included in the demodulated data 106 is latched. If the sector address in the demodulated data 106 is normal data comprising no error, the sector address state 112 is set to 1 indicating that the sector address in question is valid data. In FIG. 13, the first sector address (1111b) shows that normal data (error-free data) are latched. When a larger-than-predetermined number of error-free sector addresses are detected continuously (one sector address in FIG. 13), the sector address flag 113 is brought to 0 from 2. A check is then made to see if the sector address value is 0000b and if the sector address state is a valid state, before the block top signal 11 is generated. For the sector address latched first, the sector address state 112 is a valid state indicating that no error is contained in the sector address. But because the sector address is not 0000b, the block top signal 11 is not generated. For the next sector, the sector address is 0000b and decided to be valid data. In this case, a block top signal is generated and the block top flag 115 is brought to 0 from 2.

The synchronism detecting means 101 ensures continuity-based protection through detection of data continuities. The intra-sector position code 151 generated by the synchronizing signal shown in FIG. 11 is protected by code continuity, and the sector address latched at the sector top designated by the intra-sector position code is also protected by continuity. Thus where the detected sector address 111 is used for block top detection, only block tops are detected reliably from the normally input data in the appropriate format. Because it is possible to specify for protection based on continuity decision the number of times the synchronizing signal in FIG. 11, the intra-sector position code 151, and the detected sector address 111 should each occur continuously, a trade-off is readily made on a given system between the reliability of protection and the speed of block top detection.

Figure 14:
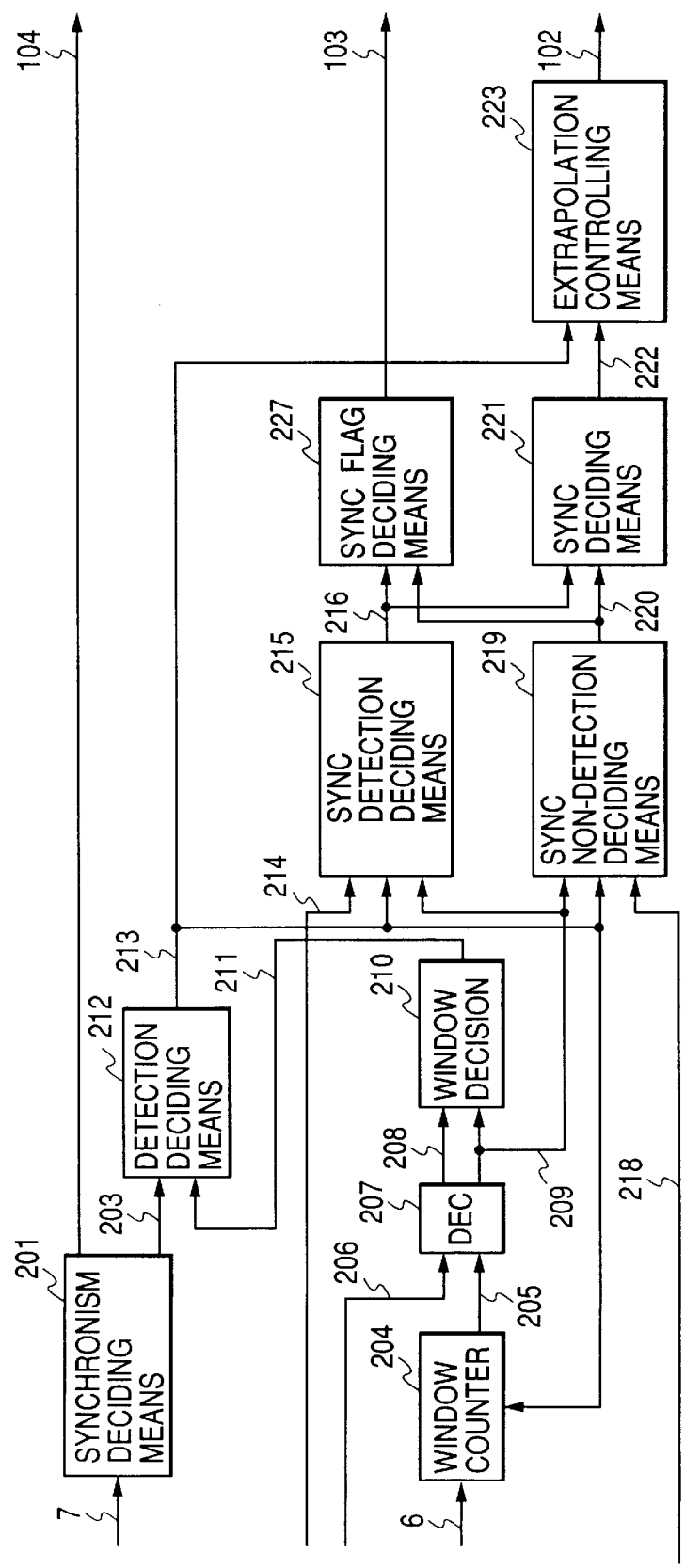
FIG. 14 is a block diagram of synchronism detecting means.

What follows is a detailed description of the various detecting means. The synchronism detecting means 101 shown in FIG. 12 is described first. FIG. 14 is a block diagram of the synchronism detecting means 101 in FIG. 12, illustrating key components. In FIG. 14, reference numeral 201 is synchronism deciding means for converting serial data to parallel data and for detecting a synchronizing signal, 203 is a synchronism detection signal, 204 is a window counter for counting the regenerative clock signal 6, and 205 is a value from the window counter 204. Reference numeral 206 denotes a control signal from the microcomputer. The control signal serves as a window set value designating the opening or closing of a window that is a timing signal for latching the synchronizing signal. Reference numeral 207 represents a decoder that generates a window open instruction 208 and a window close instruction 209 for latching the synchronizing signal depending on the window counter value 205 and window set value 206. Reference numeral 210 indicates a window controller for opening or closing the window 211 depending on the values of the window open instruction 208 and window close instruction 209. Reference numeral 212 is detection deciding means for generating a normal detection signal indicating that a normal synchronizing signal is detected from the synchronism detection signal 203 and the window 211. Reference numeral 214 is a control signal coming from the microcomputer giving a sync detection count set value by which to control the number of times the synchronizing signal is detected continuously. Reference numeral 215 is sync detection deciding means constituted by a detection counter for counting the number of times the synchronizing signal is detected continuously, and by a decoder for comparing the sync detection count set value 214 with the detection counter value. Reference numeral 216 is a continuous detection signal, and 217 is sync flag deciding means for generating the sync flag 103 based on the sync detection set value 214 and on the continuous detection signal 216. Reference numeral 218 is a control signal from the microcomputer representing a sync non-detection count set value for controlling the number of times the synchronizing signal is not detected continuously. Reference numeral 219 denotes sync non-detection deciding means constituted by a non-detection counter for counting the number of times the synchronizing signal is not detected continuously and by a decoder for comparing the sync non-detection count set value 218 with the non-detection counter value. Reference numeral 220 is a continuous non-detection signal, and 221 is sync deciding means for generating a sync decision signal 222 based on the sync non-detection count set value 218 and on the continuous non-detection signal 220. Reference numeral 223 represents extrapolation controlling means composed of an extrapolation counter and a decoder.

Figure 15:
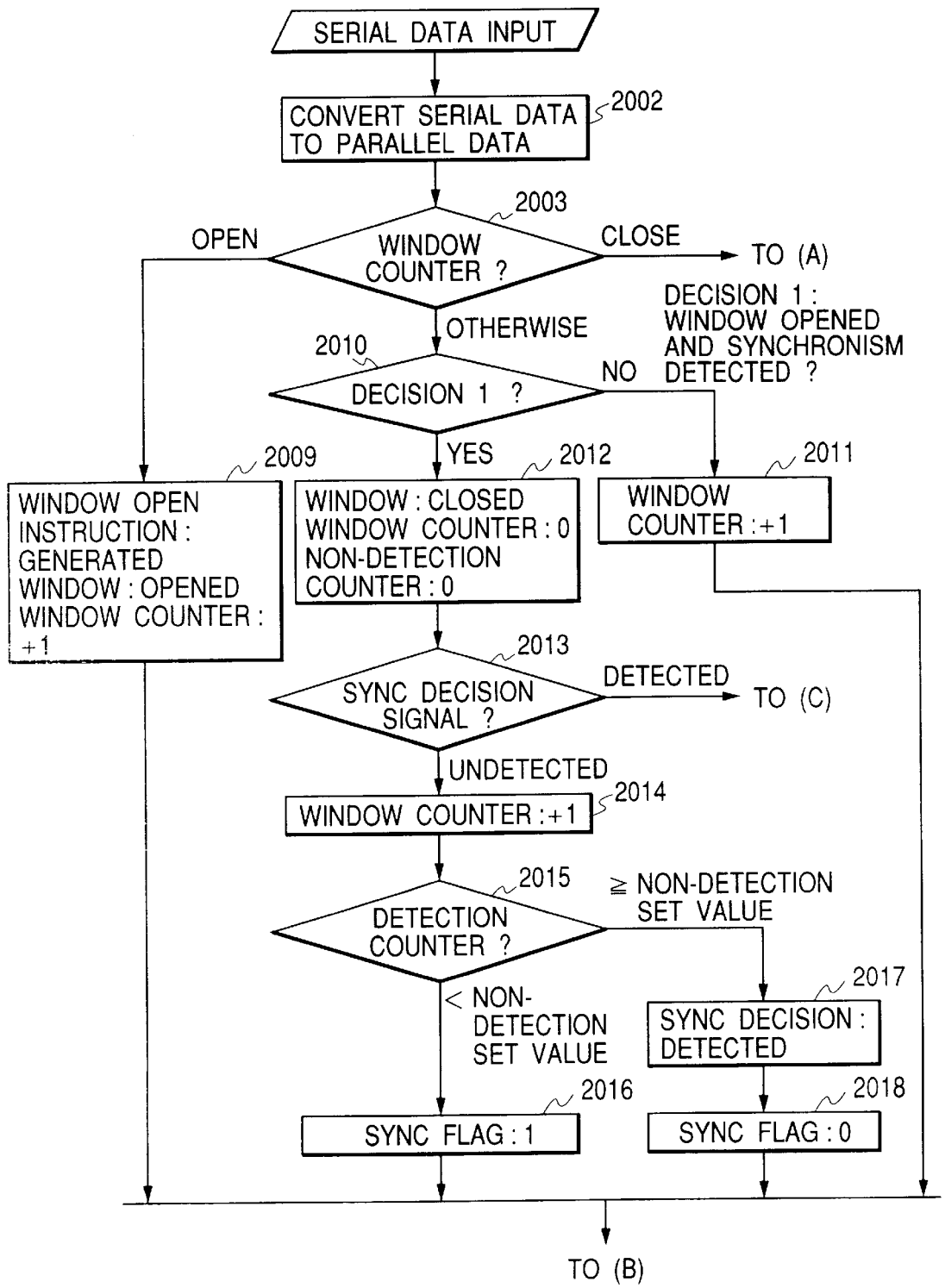
FIG. 15 is a flowchart of steps performed by the synchronism detecting means.
Figure 16:
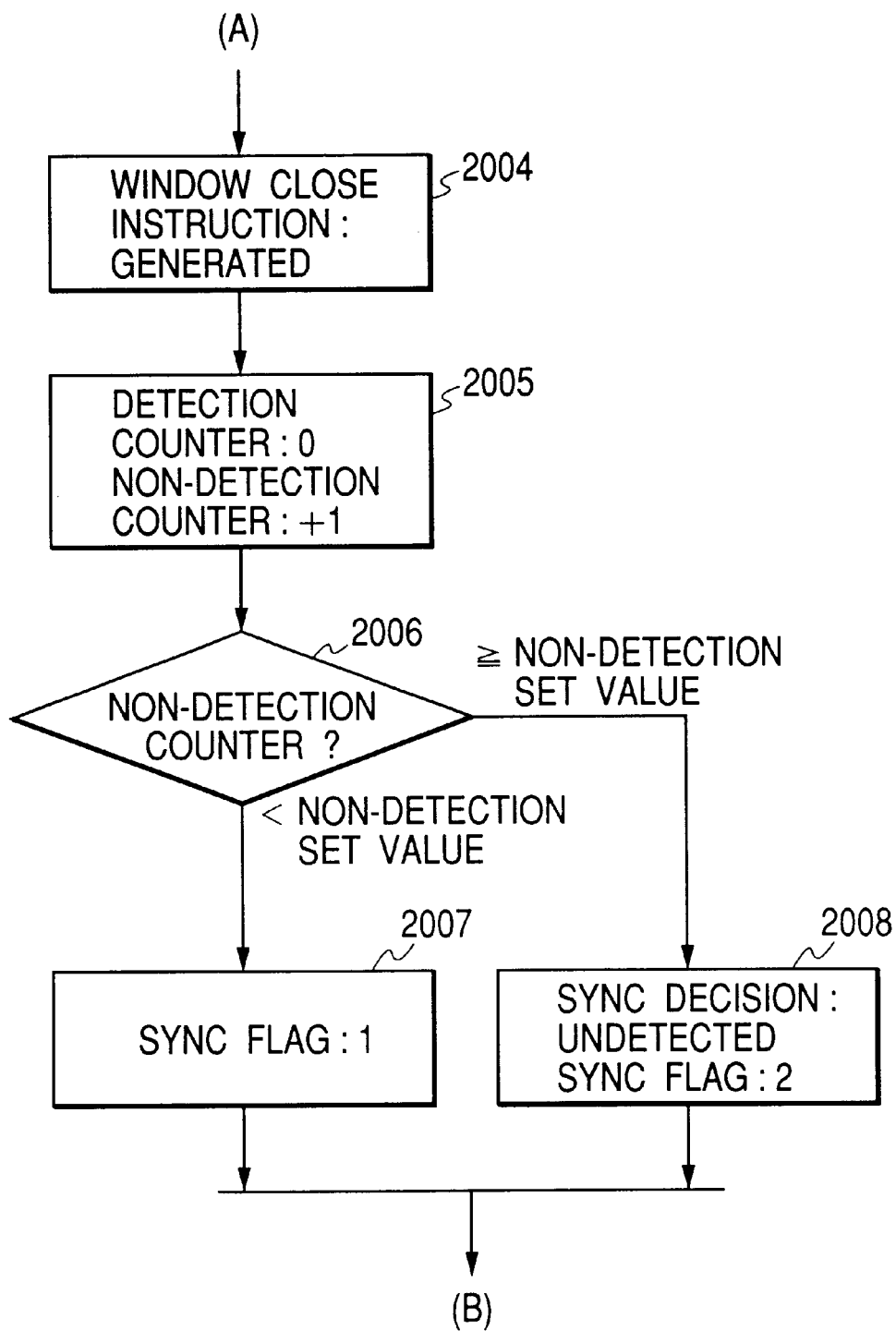
FIG. 16 is another flowchart of steps performed by the synchronism detecting means.

How the synchronism detecting means works will now be described with reference to FIGS. 15, 16 and 17. These three figures are flowcharts of steps carried out by the synchronism detecting means shown in FIG. 14.

Suppose that error-free data in the format of FIG. 11 are continuously input immediately before a synchronizing signal. In that case, serial data are converted to parallel data 202 by the synchronism deciding means 201. When the synchronizing signal of FIG. 11 is detected, the synchronism deciding means 201 generates a synchronism detection signal 203 (step 2002). The decoder 207 makes a decision by comparing the window counter value 205 with the window set value 206 (step 2003). Where the window counter 204 outputs a value designating the opening of the window, the following occurs: the decoder 207 generates the window open instruction 208 causing the window controller 210 to open the window 211 and to increment the window counter 204 (step 2009). Step 2009 is followed by (B) in FIG. 17. When error-free data are being continuously input in the format of FIG. 11, the window is opened to latch the synchronizing signal. The steps from (B) on in FIG. 17 will now be described. In FIG. 17, a check is made to see if the extrapolation counter contains a value in effect at the end of a frame, or if both the sync decision signal 222 and a specific synchronizing pattern of the synchronizing signal are detected (decision 2 in step 2019). The sync decision signal 222, when detected, indicates that the number of synchronizing signals detected continuously up to the preceding synchronizing signal is equal to or greater than the sync detection count set value 214. Since the precondition of the input data stipulates that what is input here is data other than the synchronizing signal, step 2020 is reached. In step 2020, the extrapolation counter is incremented by 1 and control is passed on to the next step. The extrapolation counter counts the number of regenerative clock signals. The value of the extrapolation counter is used as the basis for controlling frames. Because the serial data 7 are input in units of bits in synchronism with the regenerative clock signal 6, there are 1488 regenerative clock signals 6 per frame, i.e., as many as the 1488 bits constituting each frame. Then the decoder included in the extrapolation controlling means 223 decides the value of the extrapolation counter (step 2021). If the extrapolation counter value is decided to represent a time at which to output a synchronizing signal converted to parallel data from serial data, then the sync latch signal 102 is generated (step 2022). If the extrapolation counter value is not decided to represent any time at which to output a synchronizing signal converted to parallel data from serial data, then the processing is terminated and the next input is awaited. Where the window 211 is opened, the state reached here is one in which to wait for the input of a specific pattern included in the synchronizing signal. What follows is a description of the steps carried out when the window 211 is opened and a synchronizing signal is input. In step 2003, the window counter value 205 decided upon input of the synchronizing signal may be a value designating neither the opening nor the closing of the window 211. In that case, step 2010 is reached in which a check (decision 1) is made to see if the window 211 is opened and if the synchronizing pattern included in the synchronizing signal is input. According to the precondition of the input data, an error-free synchronizing signal is currently input. Thus the window 211 is decided to be opened and the synchronizing pattern included in the synchronizing signal is detected. In that case, step 2012 is reached. In step 2012, with the window 211 found to be opened and with the synchronizing signal detected, the detection deciding means 212 generates the normal detection signal 213, closes the window 211, and resets both the window counter 204 and the non-detection counter. In step 2013, a check is made to see if the sync decision signal 222 is detected. The sync decision signal 222, when detected, indicates that the number of synchronizing patterns detected continuously up to the preceding synchronizing signal is equal to or greater than the sync detection count set value 214. Since the precondition of the input data stipulates that error-free data are continuously input, the sync decision signal 222 is detected and step 2014 is reached. In step 2014, that detection counter is incremented by 1 which counts the number of times the synchronizing pattern is detected continuously during synchronism decision and detection. After the increment, the detection counter value is decided (step 2015). If the detection counter value is found to be at least as large as the sync detection set value 214, then the sync decision signal 222 is detected (step 2017) and the sync flag 103 is set to zero (step 2018) before (B) in FIG. 17 is reached. The steps following (B) in FIG. 17 have already been described.

Described below is what takes place when the synchronizing signals up to the preceding one contained no error but the current synchronizing signal is erroneous in the input data. When the synchronizing signal including an error is input, step 2002 is carried out as usual. In step 2003, the window counter value 205 may be decided to be one causing the window 211 to open. In that case, step 2009 and the subsequent steps are the same as those performed when there is no error in the data. If the window counter value 205 is decided to be other than one causing the window 211 to open or close in step 2003, then step 2010 is reached. In step 2010, the window 211 is found open but no synchronizing pattern is detected under the precondition of the input data. In such a case, step 2010 is followed by step 2011. In step 2011, the window counter 204 is incremented by 1 and (B) in FIG. 17 is reached. The steps subsequent to (B) in FIG. 17 are the same as those in effect when there is no data contained in the data. The steps so far remain unchanged until the widow counter 204 takes a value causing the window to close. If the window counter 204 is decided to have taken a value causing the window to close in step 2003, control is passed on to (A) in FIG. 16. In step 2004 following (A) in FIG. 16, a window close instruction 209 is generated. In step 2005, the detection counter for counting the number of times the synchronizing signal is detected continuously is reset in the sync detecting means 215, and the non-detection counter for counting the number of times the synchronizing signal is not detected continuously is incremented by 1 in the non-detection deciding means. In step 2006, the value of the non-detection counter is decided. If the sync non-detection count set value 218 is at least 2 under the precondition of the input data, the sync flag 103 is set to 1 (step 2007) and control is passed on to (B) in FIG. 17. If the sync non-detection count set value 218 is 1 in step 2006 in which the non-detection counter is decided, then the sync decision signal 222 is not detected and the sync flag is set 2 (step 2008) before control is passed on to (B) in FIG. 17. The steps subsequent to (B) in FIG. 17 are the same as those carried out when there is no error contained in the data.

What follows is a description of what takes place when synchronizing signals contain errors consecutively in the input data. In that case, the steps involved are basically the same as those in effect the synchronizing signals up to the preceding one had no error but the current synchronizing signal includes an error. Steps 2004 and 2005 following (A) in FIG. 16 are exactly the same as those in effect the synchronizing signals up to the preceding one had no error but the current synchronizing signal includes an error. In step 2006, the non-detection counter value is decided. If the continuous non-detection count is found to be less than the non-detection count set value 218, the sync flag 103 is set to 1 (step 2007) and control is passed on to (B) in FIG. 17. If the non-detection counter value is decided to be at least as large as the sync non-detection count set value 218 (step 2006), the sync decision signal 222 is not detected and the sync flag is set to 2 (step 2008) before control is transferred to (B) in FIG. 17. The steps subsequent to (B) in FIG. 17 are the same as those performed when the synchronizing signals up to the preceding one had no error but the current synchronizing signal includes an error.

Below is a description of what takes place when the synchronizing signals up to the preceding one had errors but the current synchronizing signal has no error in the input data. In that case, if the window counter value 205 is decided to be one causing the window to open in step 2003, the steps involved are the same as those carried out when the input data contain no error. During input of the synchronizing signals, the steps up to step 2012 in FIG. 15 are the same as those in effect when data contain no error. In step 2013, a check is made on the sync decision signal 222 indicating that the number of times the synchronizing pattern was detected continuously up to the preceding synchronizing pattern is at least as large as the sync detection count set value 214. Because the precondition of the input data presupposes that the preceding synchronizing signal had an error, the sync decision signal 222 is not detected in step 2013. Thus step 2013 is followed by step 2014. In step 2014, the detection counter is incremented by 1. The value of the detection counter is then decided in step 2015. If the detection counter value is at least as large as the sync detection count set value 214 (i.e., if the sync detection count set value is 1 for the presupposed input data), the sync decision signal 222 is detected (step 2017), then the sync flag 103 is set to 0 (step 2018), and control is transferred to (B) in FIG. 17. If the detection counter value is less than the sync detection count set value 214 (i.e., if the sync detection count set value is 2 for the presupposed input data), then the sync flag 103 is set to 1 (step 2018) before (B) in FIG. 17 is reached. The steps subsequent to (B) in FIG. 17 are the same as those in effect when the data have no error.

Figure 17:
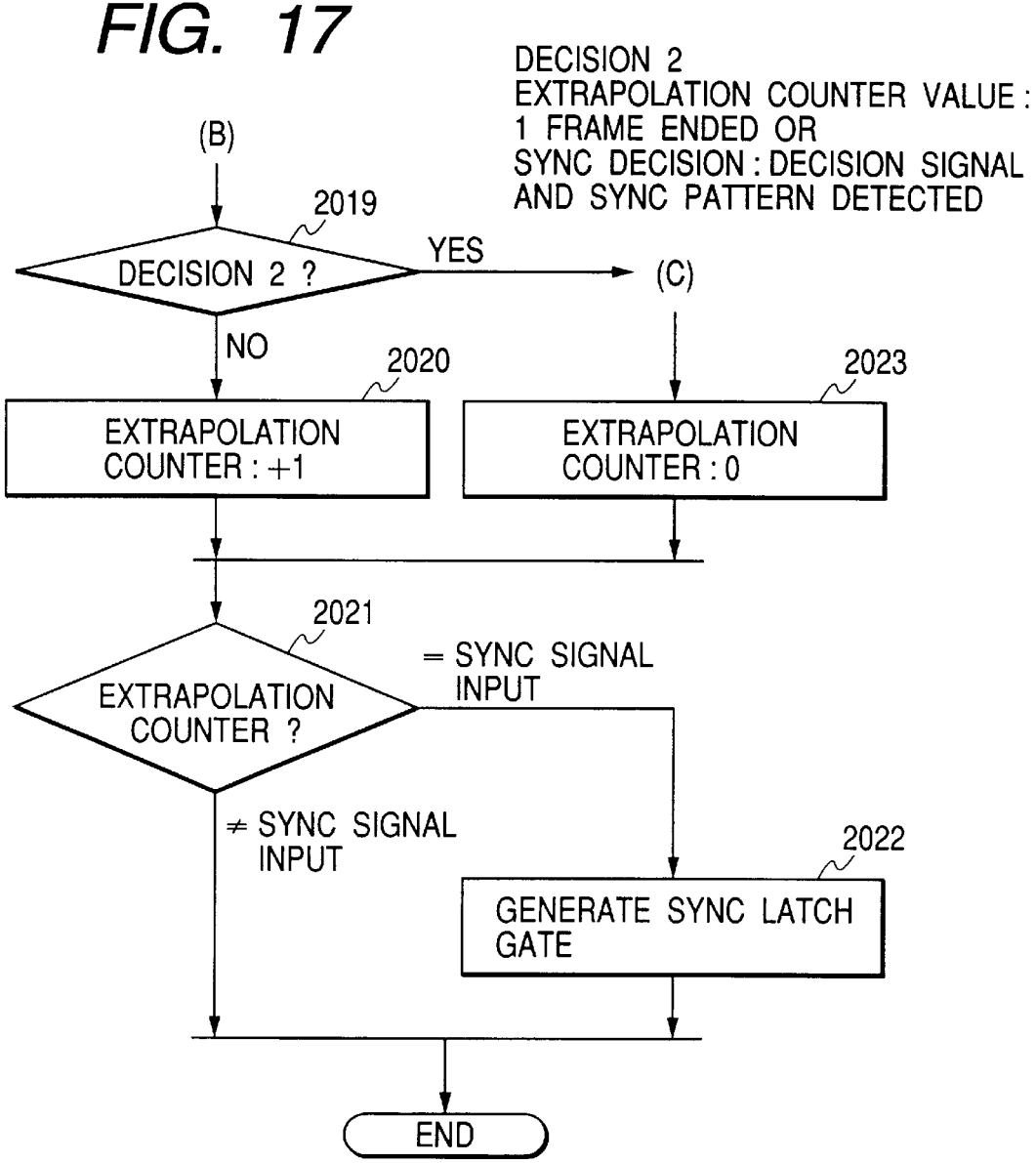
FIG. 17 is another flowchart of steps performed by the synchronism detecting means.

If no synchronizing signal is detected in the extrapolation-related steps in FIG. 17, it is still possible to generate the sync latch timing signal 102. If the preceding synchronizing signal was not detected, with the extrapolation counter value less than that in effect at the end of a signal frame, the extrapolation counter is reset upon detection of a synchronizing signal and the detected synchronizing signal is used as the basis for subsequent detection. The sync latch timing signal 102 generated in the manner above is sent to the intra-sector position detecting means.

Figure 18:
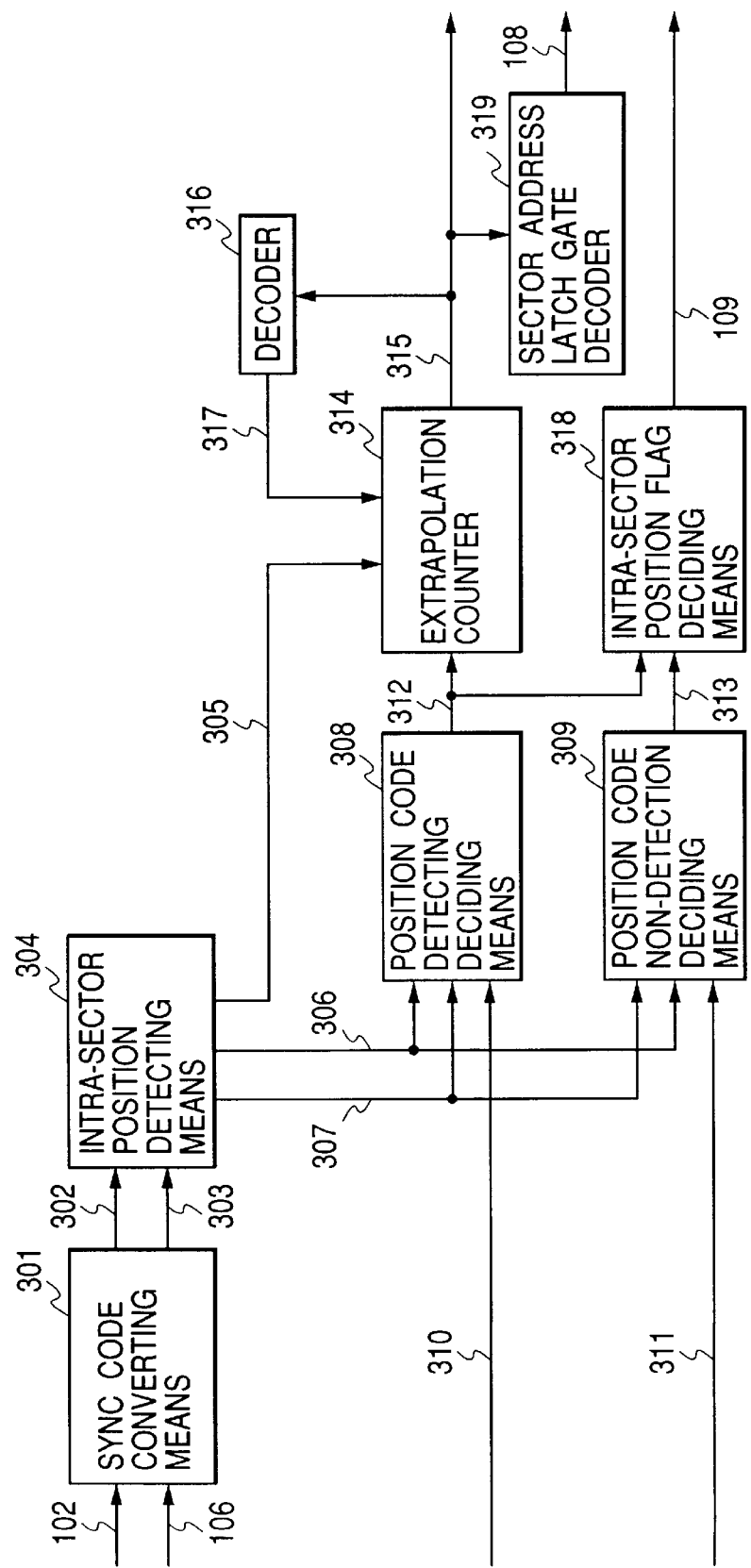
FIG. 18 is a block diagram of intra-sector position detecting means.

A typical constitution of the intra-sector position detecting means 107 shown in FIG. 12 will now be described. FIG. 18 is a block diagram of the intra-sector position detecting means 107 in FIG. 12. In FIG. 18, the sync code converting means 301 converts a synchronizing signal extracted from the demodulated data 106 in accordance with the sync latch timing signal 102. Reference numeral 302 stands for a sync code, i.e., the converted code from the sync code converting means 301, and 303 for a sync code decision signal indicating whether the converted code is valid or invalid. The intra-sector position detecting means 304 generates a detected position code 305 based on the values of as many as "p" continuous sync codes (p: natural number). Reference numeral 306 is a detected position valid signal indicating that the detected position code is valid, and 307 is a detected position code invalid signal indicating that the detected position code is invalid. The position code detection deciding means 308 comprises a counter and a decoder. The non-detection deciding means 309 also comprises a counter and a decoder. Reference numeral 310 stands for a position code detection count set value from the microcomputer for controlling the continuous position code detection count, and 311 for a position code non-detection count set value from the microcomputer for controlling the continuous position code non-detection count. Reference numeral 312 is a detected position code detection signal indicating that the number of detected position codes 305 detected continuously is at least as large as the detection count set value 310, and 313 is a detected position code non-detection signal indicating that the number of detected position codes 305 undetected continuously is at least as large as the non-detection count set value 311. Reference numeral 314 stands for an extrapolation counter for extrapolating detected position codes, 315 for a position code, and 316 for a decoder for generating a reset signal 317 for resetting the extrapolation counter depending on the position code value. The intra-sector position flag deciding means 318 switches the intra-sector position flag setting. Reference numeral 109 is an intra-sector position flag, and 319 is a decoder for generating a sector address latch timing signal 108.

How intra-sector position detecting operations are carried out by the relevant circuits will now be described with reference to FIGS. 19, 20, 21, 22 and 23. These figures are flowcharts of steps performed by the intra-sector position detecting means shown in FIG. 18.

What takes place when error-free data are input in the format of FIG. 11 is described first. The sync code converting means 301 latches synchronizing signals from the demodulated data 106 in accordance with the sync latch timing signal 102 generated by the synchronizing signal detecting means 101 in FIG. 12 (step 3002) The latched sync codes are converted and sync codes 302 are generated (step 3003). Then the intra-sector position detecting means 304 generates detected position codes 305 based on the values of continuous "p" (=natural number) sync codes 302 (step 3004). The detected position code 305 is a code assigned to each of "q" frames (q: natural number) into which a sector is divided on the basis of the continuous sync codes 302. If the continuous values of the sync codes 302. match predicted continuous values, then control is transferred to (A) in FIG. 20 (step 3005). The steps following (A) in FIG. 20 will now be described. In step 3006, the non-detection counter for counting the continuous non-detection count is reset in the non-detection deciding means 309. In step 3007, the detected position code detection signal 312 is decided.

The detected position code detection signal 312 indicates the state of the preceding detected position code 305. Specifically, the detected position code detection signal 312 indicates detection of the preceding detected position code 305 when decided to be 1 and the non-detection thereof when found to be 0. Since it is presupposed that error-free data are continuously input, the detected position code detection signal 312 is set to 1 indicating detection of the preceding detected position code 305. The detection signal being 1 signifies that the continuous detection count in the preceding decision already exceeded the position code detection count set value 310. Thus control is passed on to the next step. In step 3009, the position code detection deciding means 308 compares the detection counter value with the position code detection count set value 310. If the detection counter value is decided to be at least as large as the position code detection count set value 310 in step 3009, the detection signal is set to 1 (step 3010), and control is transferred to (C) in FIG. 22 or (D) in FIG. 23.

Figure 22:
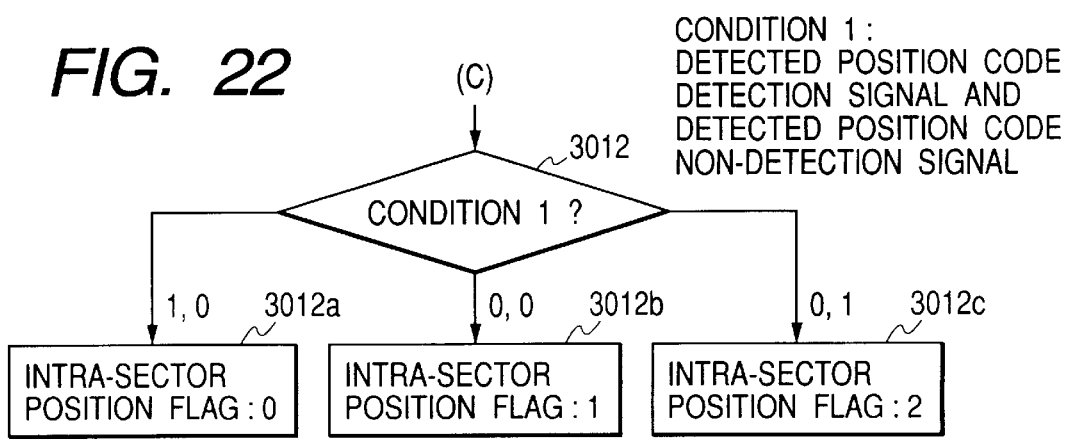
FIG. 22 is another flowchart of steps carried out by the intra-sector position detecting means.

What takes place subsequent to (C) in FIG. 22 will now be described. In step 3012, the intra-sector position flag deciding means 318 switches the intra-sector position flag 109 in accordance with the detected position code detection signal 312 and detected position code non-detection signal 313. The detected position code non-detection signal 313 indicates non-detection of detected position codes 305 when decided to be 1 and the detection thereof when found to be 0. If the detected position code detection signal 312 is 1 and the detected position non-detection code 313 is 0 (i.e., if the number of detected position codes 305 detected continuously is at least as large as the predetermined set value), the intra-sector position flag 109 is set to 0 (step 3012a); if the detected position code detection signal 312 is 0 and the detected position non-detection code 313 is 1 (i.e., if the number of detected position codes 305 undetected continuously is less than the position code detection count set value 310, or if the number of detected position codes 305 undetected continuously is less than the position code non-detection count set value 311), the intra-sector position flag 109 is set to 1 (step 3012b); if the detected position code detection signal 312 is 0 and the detected position non-detection code 313 is 1, the intra-sector position flag 109 is set to 2 (step 3012c).

Figure 23:
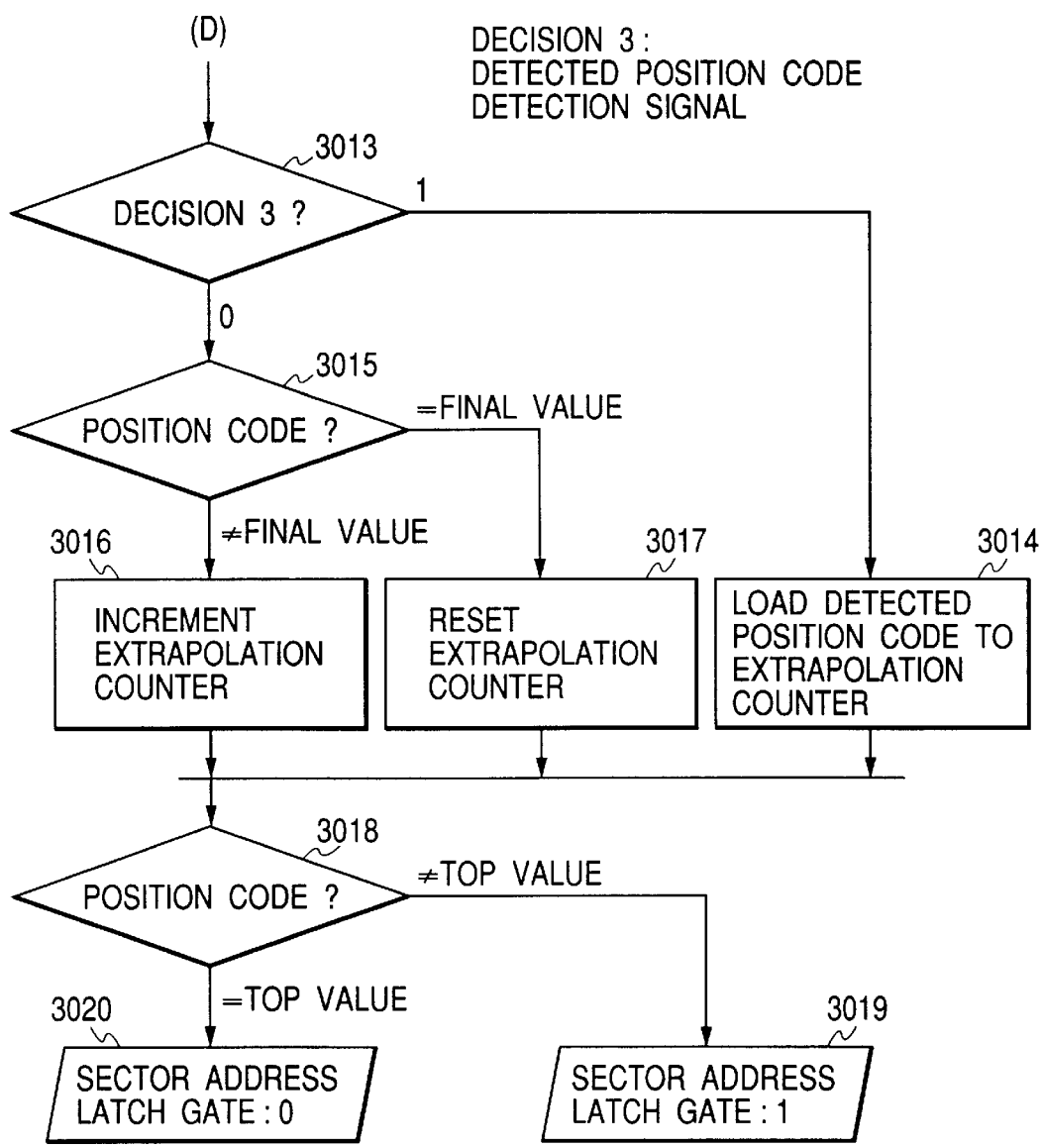
FIG. 23 is another flowchart of steps carried out by the intra-sector position detecting means.

Following (D) in FIG. 23, a check is made to see if the detected position code detection signal 312 indicates detection (step 3013). Because the detected position code detection signal 312 is 1 under the precondition of the input data, the detected position code generated on the basis of the continuous values of the, sync codes is loaded to the extrapolation counter (step 3014). For a typical output scheme, detected position codes may be loaded to the counter in accordance with the detected position code detection signal, and the counter output may be taken as a position code. This, however, is not limitative of the invention and any other suitable output scheme may be adopted. In step 3018, a check is made to see of the position code 315 is a value indicating a sector top. If the position code 315 is decided to be a top value, the sector address latch gate decoder 319 generates a sector address latch timing signal 108 (step 3019). If the position code 315 is other than a top value, the sector address latch timing signal 108 is not generated (step 3020). This way of generating the sector address latch timing signal 108 is not limitative of the invention. Alternatively, the position code may be sent directly to the sector address detecting means which in turn may decide the sector top based on the position code value, so that the sector address may be latched accordingly.

Figure 19:
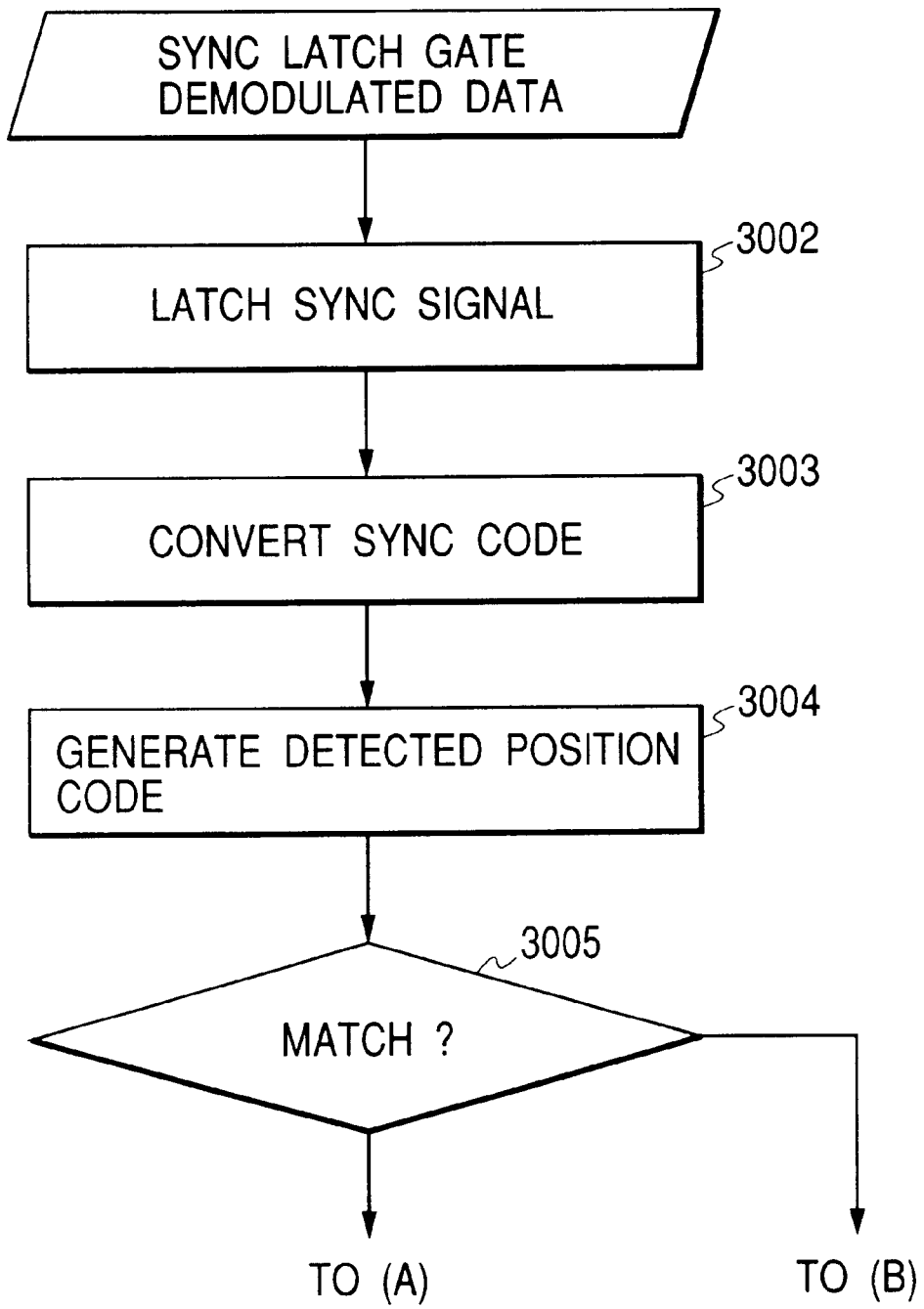
FIG. 19 is a flowchart of steps carried out by the intra-sector position detecting means.

Below is a description of what takes place when the synchronizing signals up to the preceding one had no error but the current synchronizing signal includes an error in the input data. The steps up to step 3004 in the flowchart of FIG. 19 are the same as those in effect when the input data have no error. In step 3005, because the current synchronizing signal is decided to have an error based on the continuous values of sync codes 302, the continuous values do not match the predicted values. In that case, step 3005 is followed by (B) in FIG. 21. In step 3021 subsequent to (B) in FIG. 21, the detection counter included in the position code detection deciding means 308 is reset. In step 3022, the detected position code non-detection signal 313 is decided. The detected position code non-detection signal 313 indicates non-detection of the preceding detected position code when decided to be 1 and the detection thereof when found to be 0. Because the current detected position code is invalid (i.e., undetected), the non-detection counter in the position code non-detection deciding means 309 is incremented by 1 in step 3023. In step 3024, the non-detection counter is decided. Specifically, the position code non-detection deciding means 309 compares the value of the non-detection counter with the position code non-detection count set value 311. If the non-detection counter value is decided to be less than the position code non-detection count set value 311, the detected position code non-detection signal 313 is set to 0 (step 3025) and control is passed on to (C) in FIG. 22 or (D) in FIG. 23. The steps subsequent to (C) in FIG. 22 are the same as those in effect when the input data contain no error. In step 3013 following (D) in FIG. 23, a check is made to see if the detected position code detection signal 312 is detected. Because the current synchronizing signal has an error in the presupposed input data, the detected position code detection signal 312 is 0 (i.e., invalid) and thus step 3015 is reached. In step 3015, the value of the preceding position code is decided. If the value of the preceding position code is less than the final value in effect when the sector is divided into "q" frames, the value of the extrapolation counter 314 is incremented (step 3016) and the counter value is taken as the position code. If the value of the preceding position code indicates the final value, the decoder 316 generates the reset signal 317 to reset the extrapolation counter 314, and the counter value is regarded as the position code (step 3017). The steps subsequent to step 3018 are the same as those in effect when the input data have no error.

There is a case in which data having erroneous synchronous signals are input continuously. In that case, the steps involved are the same as those performed when the current synchronizing signal has an error.

Figure 20:
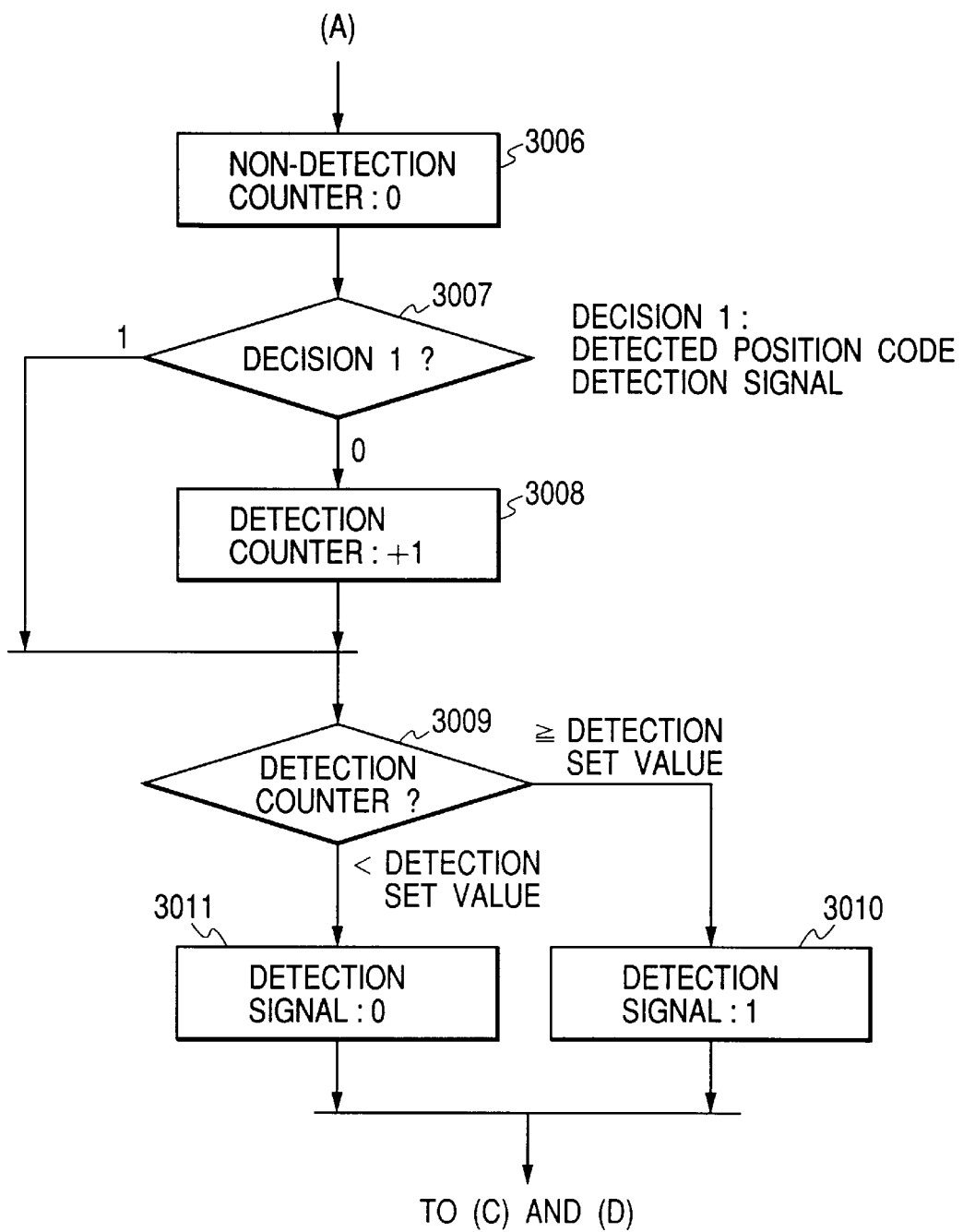
FIG. 20 is another flowchart of steps carried out by the intra-sector position detecting means.
Figure 21:
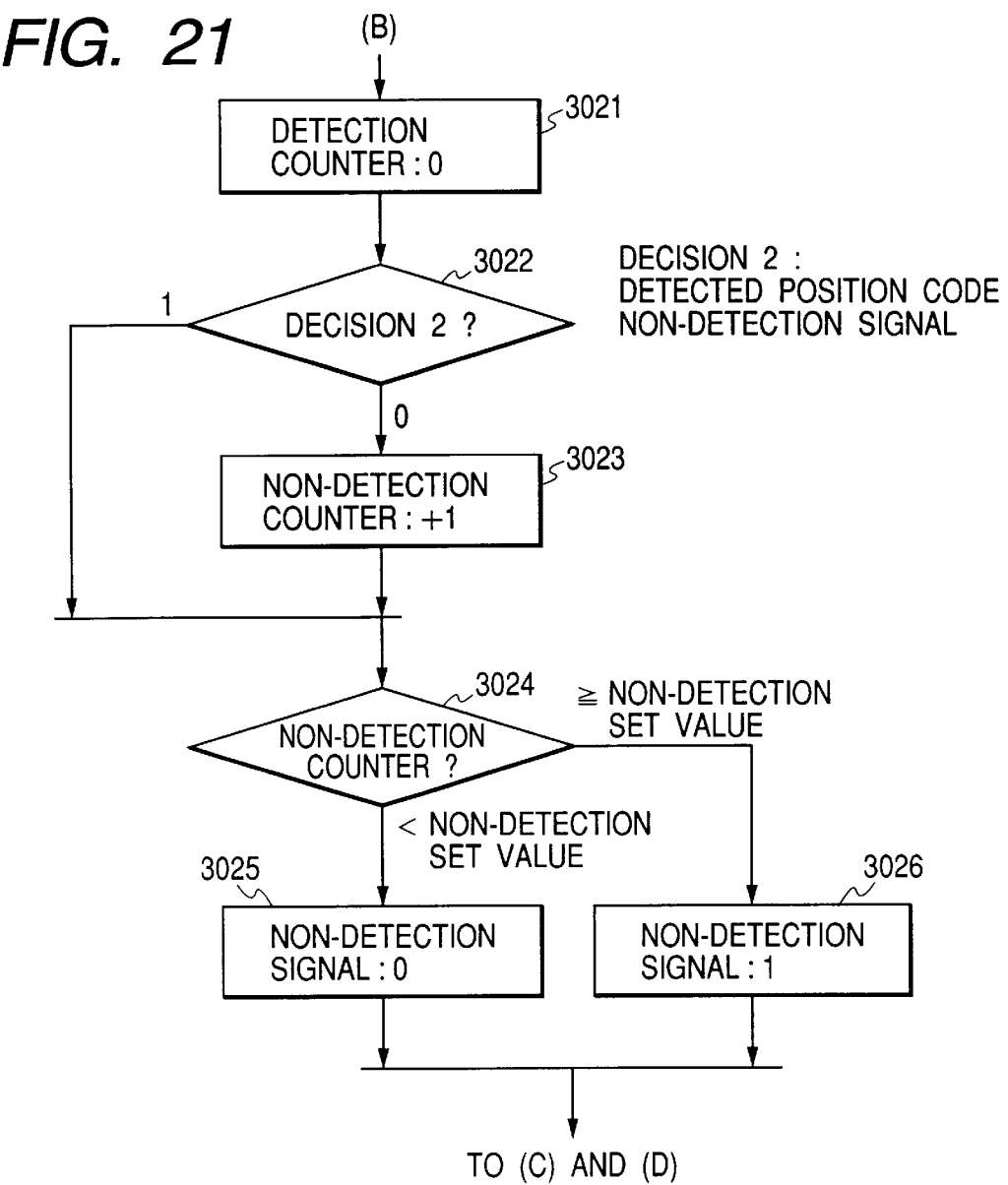
FIG. 21 is another flowchart of steps carried out by the intra-sector position detecting means.

Described below is what takes place when the synchronous signals up to the preceding one had errors but the current synchronizing signal has no error in the input data. In this case, step 3002 in FIG. 19 to step 3006 in FIG. 20 are the same as those carried out when error-free data are input. In step 3007, the detected position code detection signal 312 is decided. The detected position code detection signal 312 indicates detection of the preceding detected position code 305 when decided to be 1 and the non-detection thereof when: found to be 0. If the detected position code detection signal 312 is 0 (i.e., if the number of position codes 305 undetected continuously up to the preceding detected position code is at least as large as the position code detection count set value 310), the current detected position code is valid. In that case, the detection counter for counting the continuous detection count is incremented inside the position code detection deciding means 308. Specifically, the continuous detection count is incremented by 1 (step 3008).

If the detected position code detection signal 312 is found to be 1 in step 3007, it signifies that the number of position codes detected continuously up to the preceding decision is at least as large as the position code detection count set value 310, and the next step is reached. In step 3009, the position code detection deciding means 308 compares the detection counter value with the position code detection set value 310. If the value of the detection counter is decided to be less than the position code detection set value 310, the detected position code detection signal 312 is set to 0 (step 3011), and control is transferred to (C) in FIG. 22 or (D) in FIG. 23. If the detection counter value is found to be at least as large as the position code detection set value 310 in step 3009, the detection value is set to 1 (step 3010), and control is passed to (C) in FIG. 22 or (D) in FIG. 23. The steps following (C) in FIG. 22 or (D) in FIG. 23 are the same as those in effect when the current synchronizing signal has an error. A sector address fetch gate signal generated in the manner above is sent to the sector address position detecting means.

Figure 24:
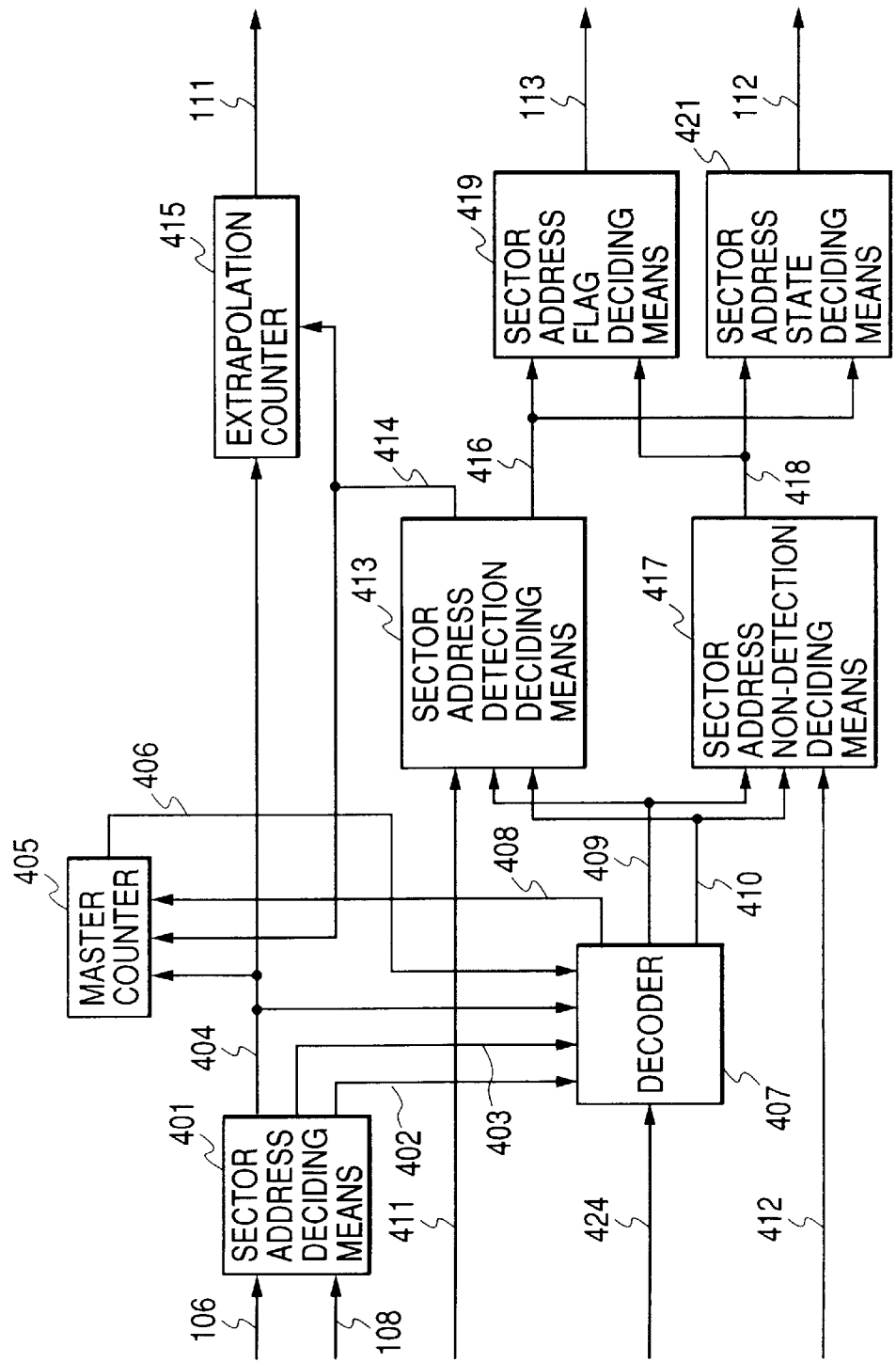
FIG. 24 is a block diagram of sector address detecting means.

A typical constitution of the sector address position detecting means 110 shown in FIG. 12 will now be described. FIG. 24 is a block diagram of the sector address position detecting means 110 in FIG. 12. In FIG. 24, the sector address deciding means 401 extracts a sector address from the demodulated data 105 in accordance with the sector address fetch timing signal 108 so as to generate a signal 402 indicating the current sector address state and a signal 403 denoting the preceding sector address state. Reference numeral 404 stands for a sector address, 405 for a master counter to which a normal sector address is loaded, and 406 for the value of the master counter 405. Reference numeral 407 represents a decoder that receives the signal 402 indicating the current sector address state, the signal 403 showing the preceding sector address state, the sector address 404, and the master counter value 406 in order to generate a signal 408 to be loaded to the master counter 405, a sector address detection signal 409, and a sector address non-detection signal 410. Reference numeral 411 is a sector address detection count set value from the microcomputer for controlling the continuous detection count, and 412 is a sector address non-detection count set value from the microcomputer for controlling the continuous non-detection count. The sector address detection deciding means 413 comprises a counter and a decoder for comparing the counter value with the sector address detection count set value 411. Reference numeral 414 is a load control signal generated by the sector address detection deciding means 413 for control over the loading of data to the master counter 405 and extrapolation counter 415. Reference numeral 416 stands for a continuous detection signal generated by the sector address detection deciding means 413 when the number of sector addresses detected continuously is at least as large as the detection count set value 411. The sector address non-detection deciding means 417 includes a counter and a decoder for comparing the counter value with the sector address non-detection count set value 412. Reference numeral 418 represents a continuous non-detection signal generated by the sector address non-detection deciding means 417 when the number of sector addresses undetected continuously is at least as large as the non-detection count set value 412. The sector address flag deciding means 419 generates a sector address flag 113. The sector address state deciding means 420 for deciding the sector address state generates a sector address state signal 112 indicating the decided sector address state. Reference numeral 111 stands for a detected sector address, and 421 for a sector address decision control set value from the microcomputer.

Sector address detecting operations by the circuits involved will now be described with reference to FIGS. 25, 26, 27, 28 and 29. These figures are flowcharts of steps performed by the sector address detecting means shown in FIG. 24.

Below is a description of what takes place when error-free data in the format of FIG. 11 are input continuously or when data having IEC (parity data) conductive to correcting a sector address 404 are input continuously. In step 4001, the sector address deciding means 401 latches a sector address from the demodulated data 106 in accordance with the sector address latch timing signal 108 generated by the intra-sector position detecting means 107 shown in FIG. 12. The state of the sector address is indicated by one of three values: 0 (with no error), 1 (erroneous but correctable by use of IEC), or 2 (erroneous and uncorrectable by IEC). Other criteria for deciding the sector address and other assignments of values may be adopted alternatively (step 4002). In step 4003, the sector address decision control set value is used as the basis for determining whether the sector address is to be corrected by use of IEC. If IEC-based correction is decided to be specified, the sector address deciding means 401 performs the correction (step 4004); if IEC-based correction is not designated, the correction will not be carried out. The decoder 407 then decides the signal 402 indicating the state of the current sector address. Under the precondition of the input data, the signal 402 denoting the current sector address state is 0 or 1 (step 4005), so that the next step is reached. In step 4006, a check is made on the continuity of sector addresses. If sector addresses are not decided to be continuous, the non-detection counter inside the sector address non-detection deciding means 417 is reset, and control is transferred to (A) in FIG. 26 (step 4009). If the sector addresses are found to be continuous, the state of the preceding sector address is decided on the basis of the signal 403 indicating the preceding sector address state (step 4007). Because the signal 403 denoting the preceding sector address state takes a value of 0 or 1 under the precondition of the input data, step 4008 is reached. In step 4008, the decoder 407 compares the sector address 404 with the master counter value 406. Under the precondition of the input data, the sector address 404 matches the master counter value 406. Thus the non-detection counter is reset and control is passed on to (A) in FIG. 26 (step 4009). The steps following (A) in FIG. 26 will now be described. Transition to (A) in FIG. 26 occurs when the preceding and current sector addresses either have no error or are erroneous but may be corrected by use of IEC. In step 4011, the detection counter is incremented by 1 on the assumption that the sector address processed currently is a continuously detected sector address. In step 4012, the sector address detection deciding means 413 compares the value of the detection counter with the sector address detection set value 411. If the continuous detection count up to the currently processed sector address 404 is at least as large as the sector address detection set value 411, the latched sector address 404 is loaded to the master counter 404 and extrapolation counter 415 (step 4013). If IEC-based correction is selected, the IEC-corrected sector address 404 is loaded (step 4013). In step 4014, the sector address flag deciding mean 419 sets the sector address flag 113 to 0. In step 4015, the sector address state deciding means 420 renders the sector address state 112 valid. Control is then transferred to (D) in FIG. 29. In step 4025 subsequent to (D) in FIG. 29, the master counter 405 is incremented by 1. In step 4026, the value of the extrapolation counter is regarded as the sector address. In step 4027, the detected sector address 111 and the sector address state signal 112 are output.

Figure 25:
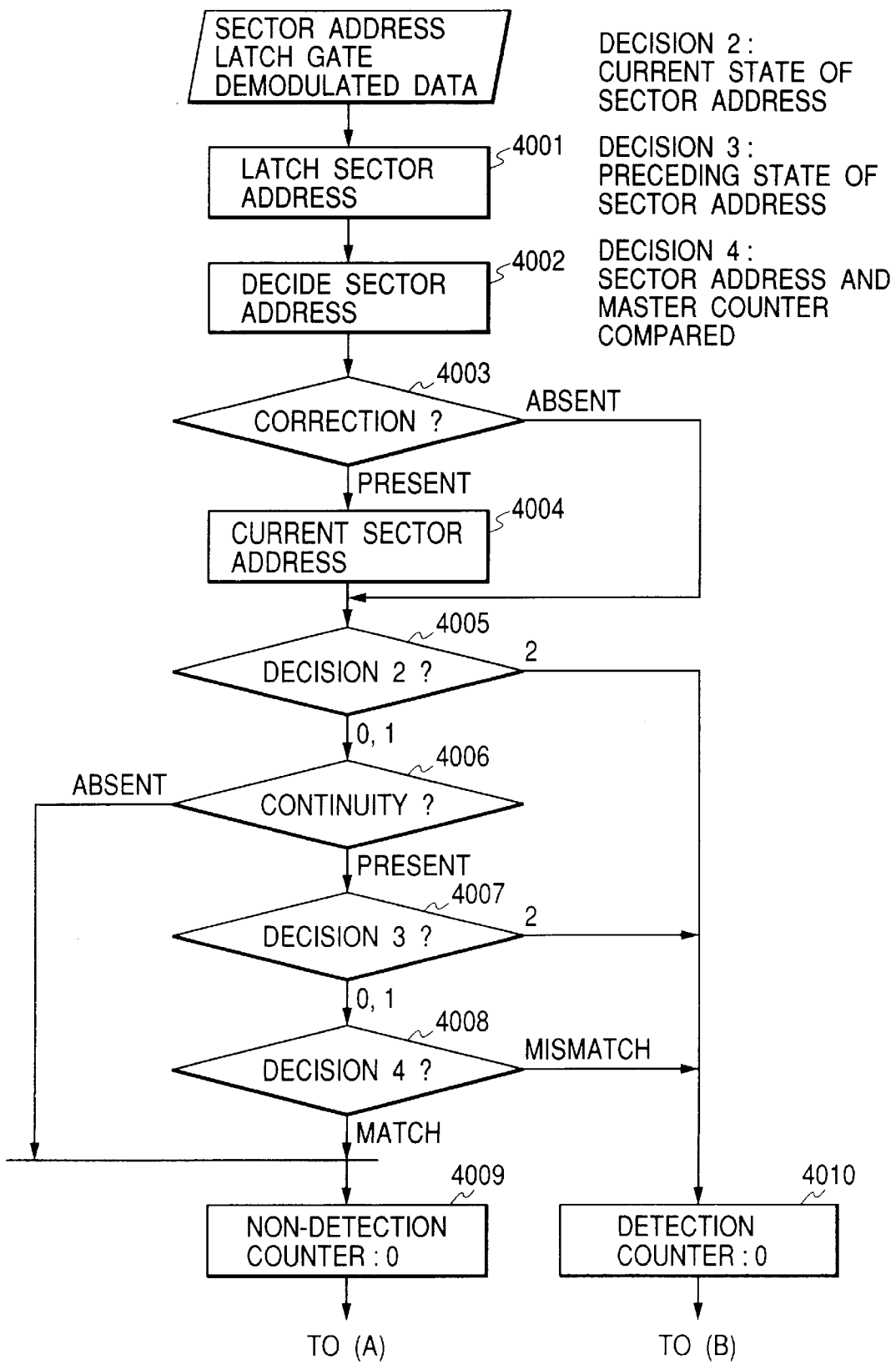
FIG. 25 is a flowchart of steps executed by the sector address detecting means.
Figure 26:
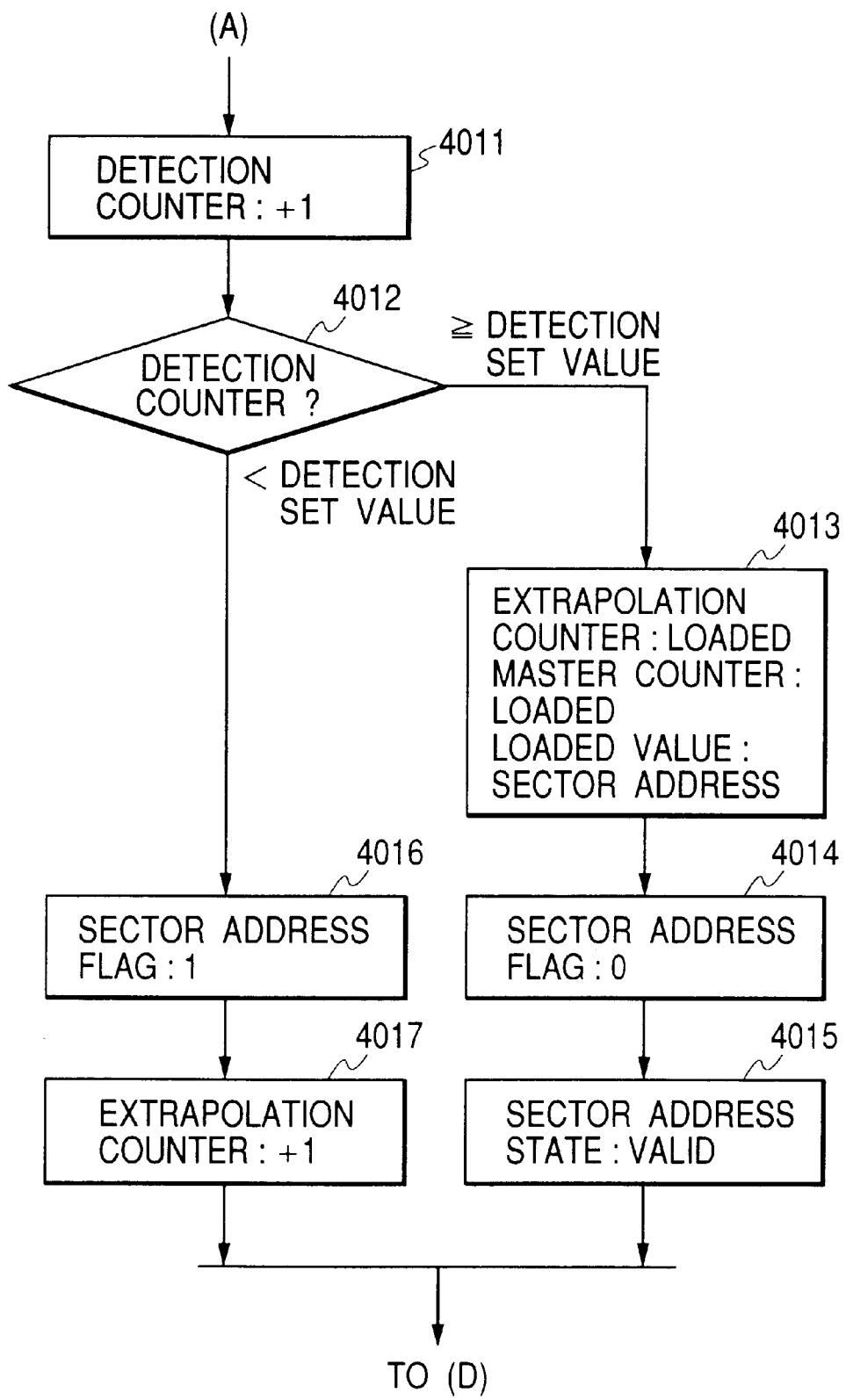
FIG. 26 is another flowchart of steps executed by the sector address detecting means.
Figure 27:
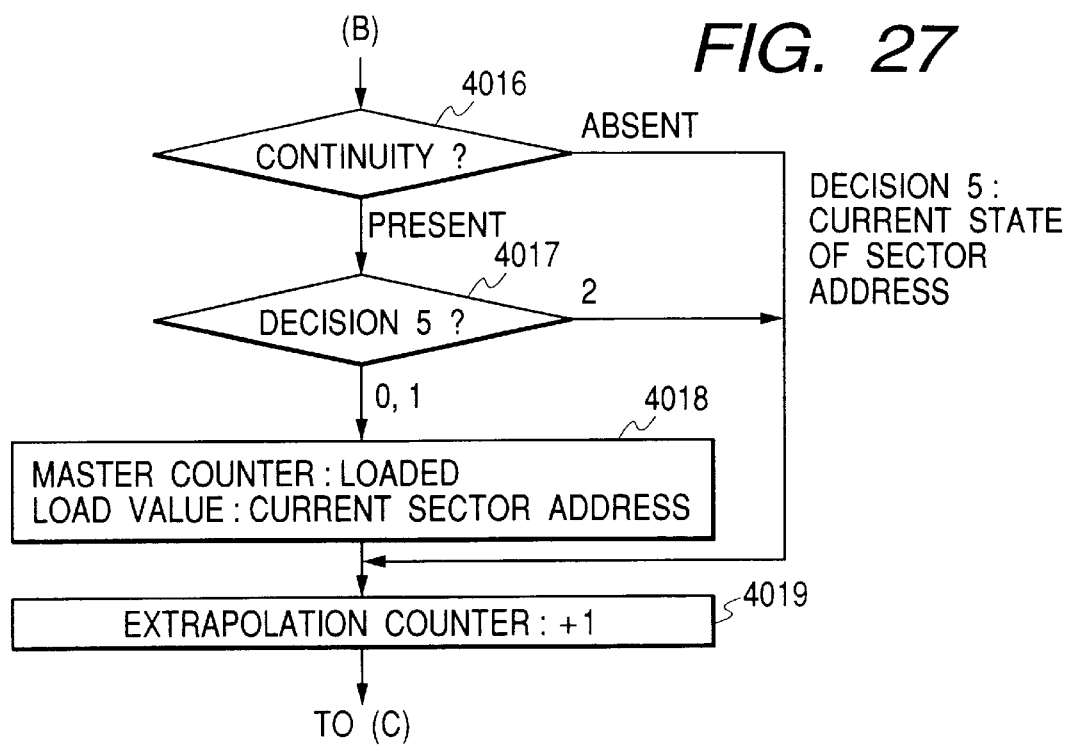
FIG. 27 is another flowchart of steps executed by the sector address detecting means.
Figure 28:
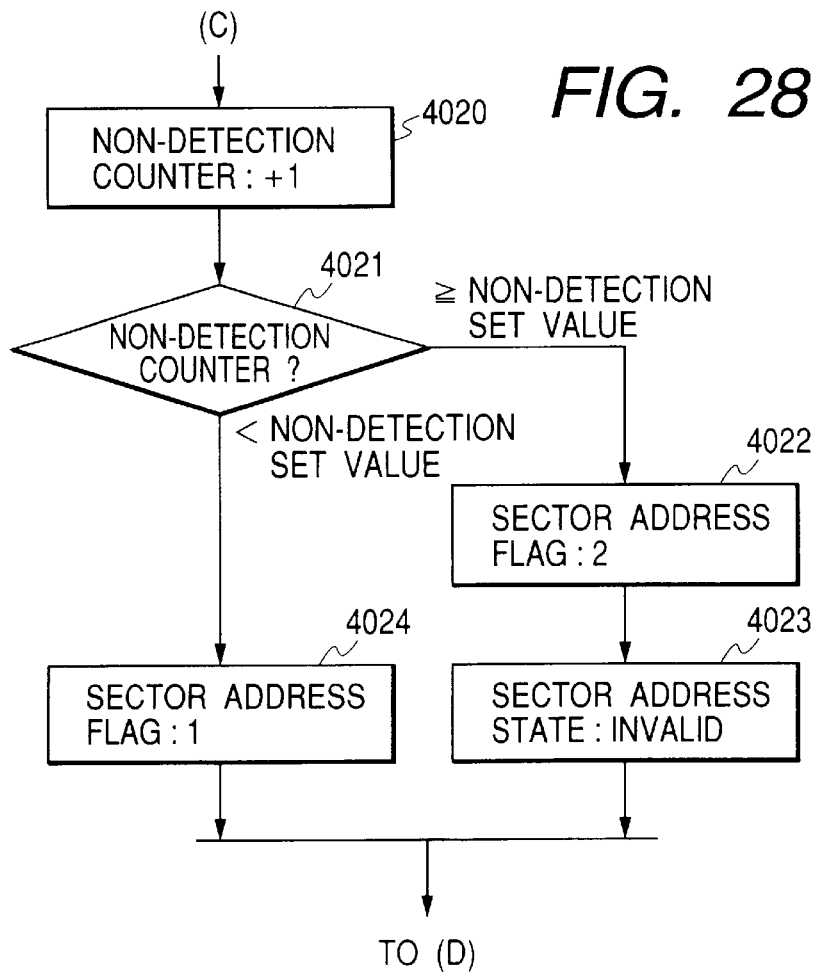
FIG. 28 is another flowchart of steps executed by the sector address detecting means.
Figure 29:
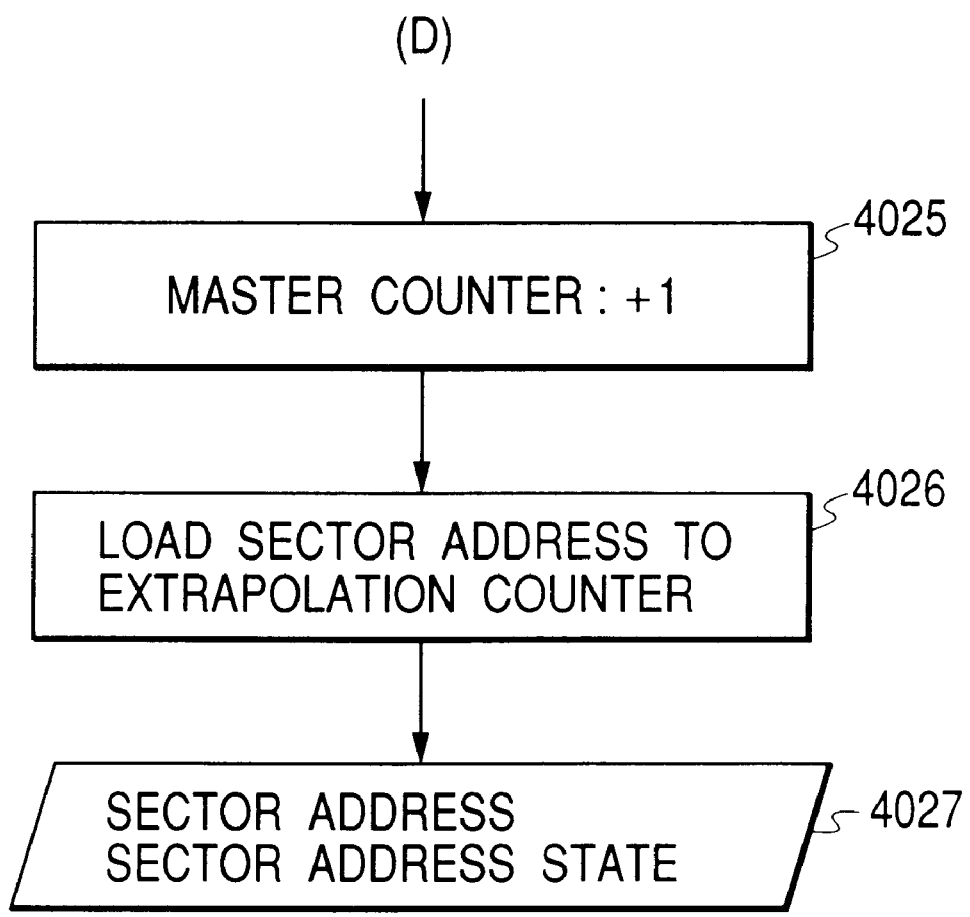
FIG. 29 is another flowchart of steps executed by the sector address detecting means.

Described below is what takes place when the sector addresses up to the preceding one had no error but the current sector address has an error and is not conducive to IEC-based correction in the input data. The steps up to step 4004 in FIG. 25 are the same as those in effect when error-free data are input. In step 4005, the current sector address is decided to be conducive to IEC-based correction. The signal 402 indicating the current sector address state is found to take a value of 2, so that step 4010 is reached. In step 4010, the detection counter is reset, and control is transferred to (B) in FIG. 27. The steps following (B) in FIG. 27 will now be described. In step 4016, a check is made on the continuity of sector addresses. If the sector addresses are not decided to be continuous, the extrapolation counter 415 is incremented by 1 and control is passed on to (C) in FIG. 28 (step 4019). If the sector addresses are found to be continuous, the signal 403 indicating the current sector address state is decided (step 4017). If the signal denoting the current sector address state is found to be 2 (i.e., the current sector address is not conducive to IEC-based correction), then the extrapolation counter 415 is incremented by 1 and control is transferred to (C) in FIG. 28 (step 4019). If the signal 403 indicating the current sector address state is 0 or 1 (i.e., the current sector address either has no error or is erroneous but conducive to IEC-based correction), then the current sector address 404 is loaded to the master counter 405 (step 4018). Thereafter, the extrapolation counter is incremented by 1 and control is transferred to (C) in FIG. 28. The steps subsequent to (C) in FIG. 28 will now be described. In step 4020, the non-detection counter inside the sector address non-detection deciding means 417 is incremented by 1. In step 4021, the decoder inside the sector address non-detection deciding means 417 compares the value of the non-detection counter with the sector address non-detection set value 412. If the non-detection counter value is at least as large as the sector address non-detection set value 412, the sector address non-detection deciding means 417 generates a sector address non-detection signal 418 and the sector address flag deciding means 419 sets the sector address flag 113 to 2 (step 4022). In step 4023, the sector address non-detection signal 418 causes the sector address state deciding means 420 to invalidate the sector address state 112, and control is passed on to (D) in FIG. 29. If, in step 4021, the non-detection counter value is decided to be less than the sector address non-detection set value 412, the sector address flag deciding means 419 sets the sector address flag 113 to 1 (step 4024) before (D) in FIG. 29 is reached. The steps subsequent to (D) in FIG. 29 are the same as those in effect when input data either have no error or are erroneous but conducive to IEC-based correction of sector addresses 404.

There is a case where input data are not conducive to IEC-based correction of the sector address 404. In that case, the steps involved are the same as those in effect when the preceding sector address 404 either has no error or is erroneous but conducive to IEC-based sector address correction in the input data.

Below is a description of what occurs when the sector addresses up to the preceding one were erroneous and not conducive to IEC-based sector address correction but the current sector address 404 either has no error or is erroneous but conducive to IEC-based correction in the input data. Steps 4001 to 4005 in FIG. 25 are the same as those in effect when the input data either have no error or are erroneous but conducive to IEC-based sector address correction. If the sector address 404 is not decided to be continuous in step 4006, the remaining steps are the same as in effect when the input data either have no error or are erroneous but conducive to IEC-based correction. If the sector addresses 404 are found to be continuous, step 4007 is reached. In step 4007, the signal 403 indicating the preceding sector address state is decided. The decision of step 4007 reveals that the preceding sector address 404 is not conducive to IEC-based correction, with the signal 403 taking a value of 2. Thus step 4007 is followed by step 4010. The steps subsequent to step 4010 are the same as those in effect when the sector addresses up to the preceding one had no error while the current sector address is erroneous and not conducive to IEC-based correction in the input data.

In the manner described, normal or correctable sector addresses are output unchanged. Invalid sector addresses when input may be replaced by extrapolated values that are output as sector addresses. The low-order four bits of each sector address and the sector address state are sent to the block top detecting means 114.

Figure 30:
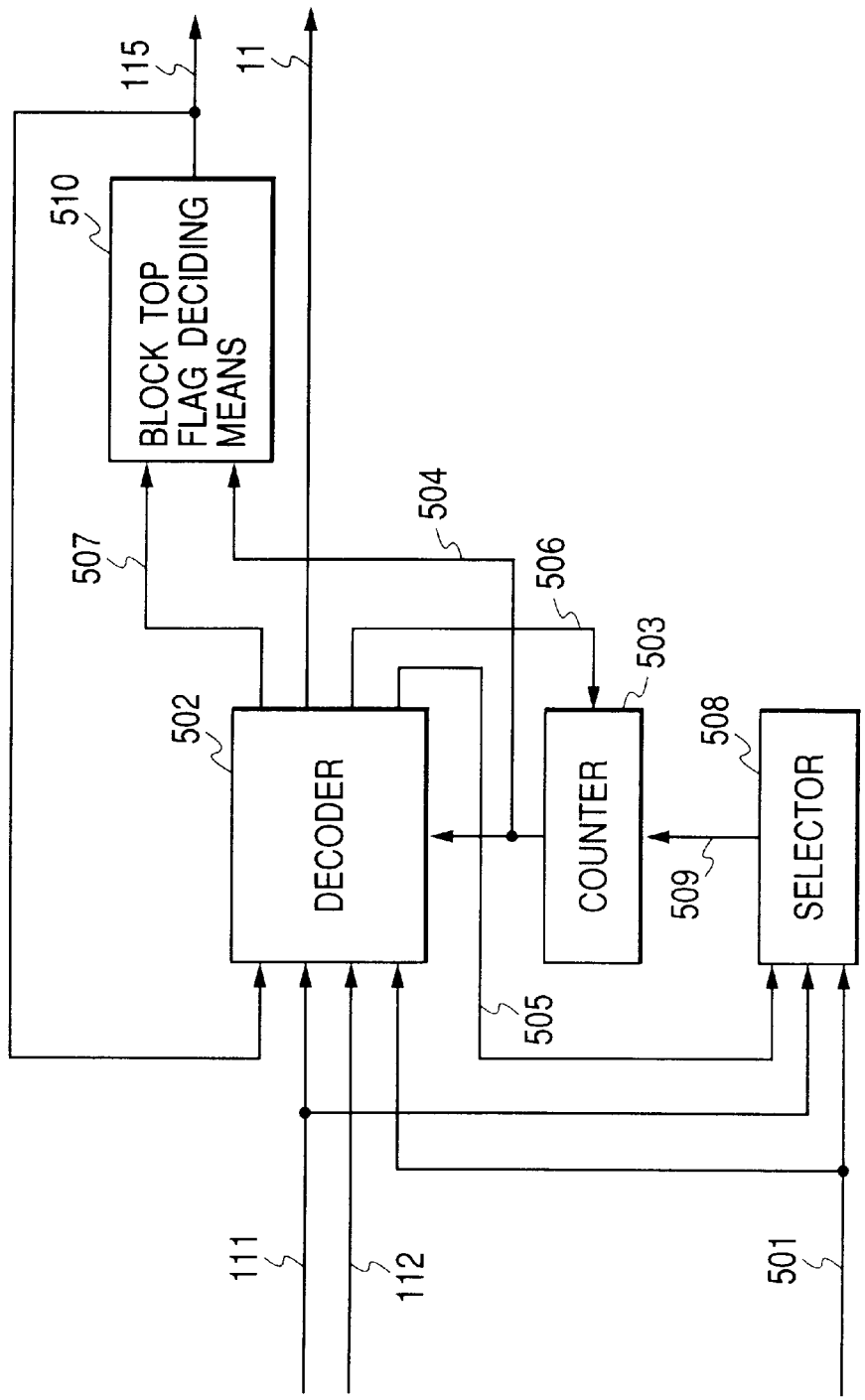
FIG. 30 is a block diagram of block top detecting means.

A typical constitution of the block top detecting means 114 will now be described. FIG. 30 is a block diagram of the block top detecting means 114 shown in FIG. 12. In FIG. 30, reference numeral 501 stands for a block top non-detection set value for continuous non-detection control, 502 for a decision decoder, 503 for a counter for counting the number of sectors, 504 is a value from the counter 503, 505 for a select signal, 506 for a counter reset signal, and 507 is a flag control signal. Reference numeral 508 is a selector for switching the value to be loaded to the counter 503 in accordance with the select signal 505, thereby generating select data 509. The block top flag deciding means 510 switches a block top flag 115 in accordance with the counter value 504 and flag control signal 507. Reference numeral 115 stands for the block top flag, and 11 for a block top detection signal.

Figure 31:
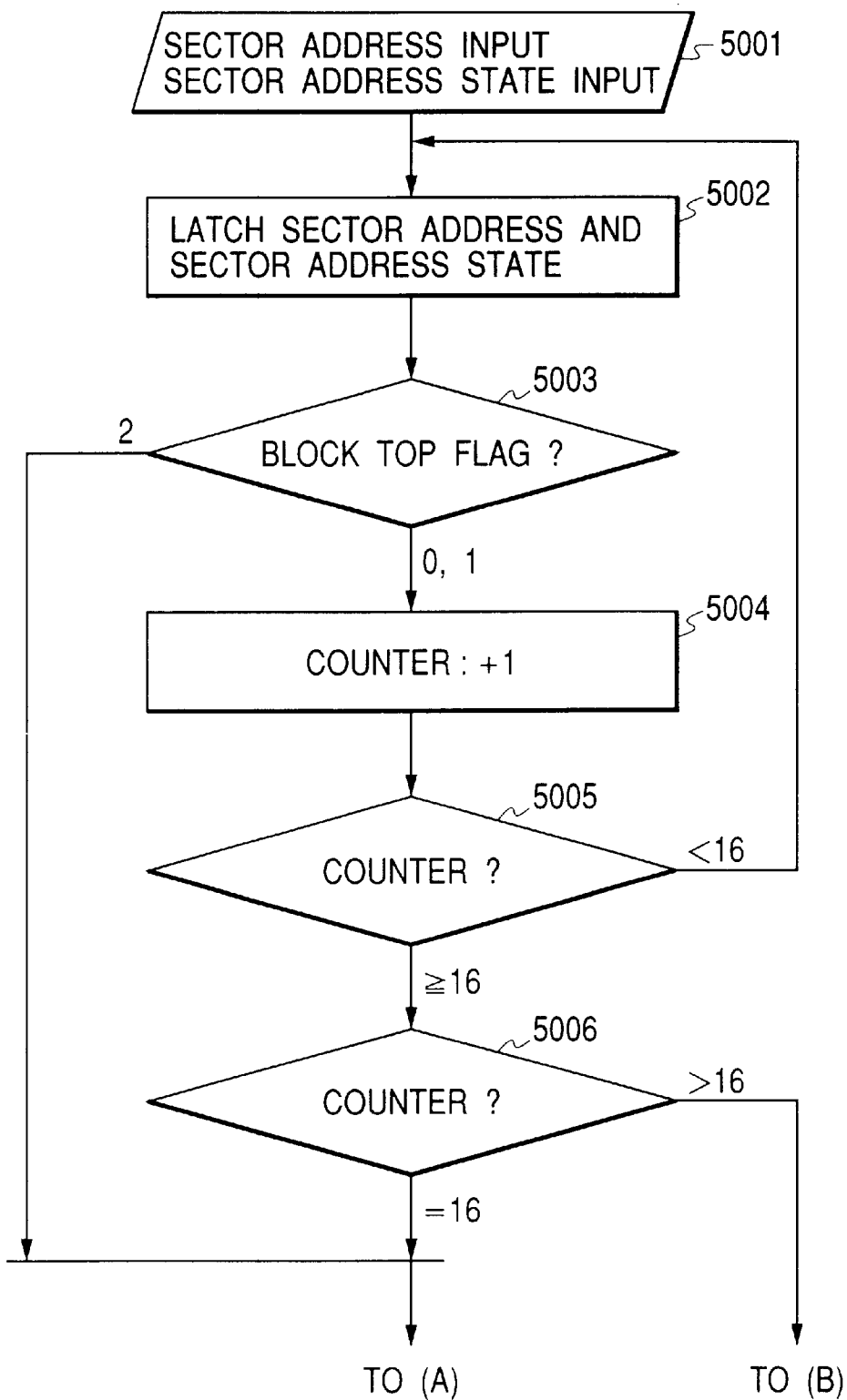
FIG. 31 is a flowchart of steps effected by the block top detecting means.
Figure 32:
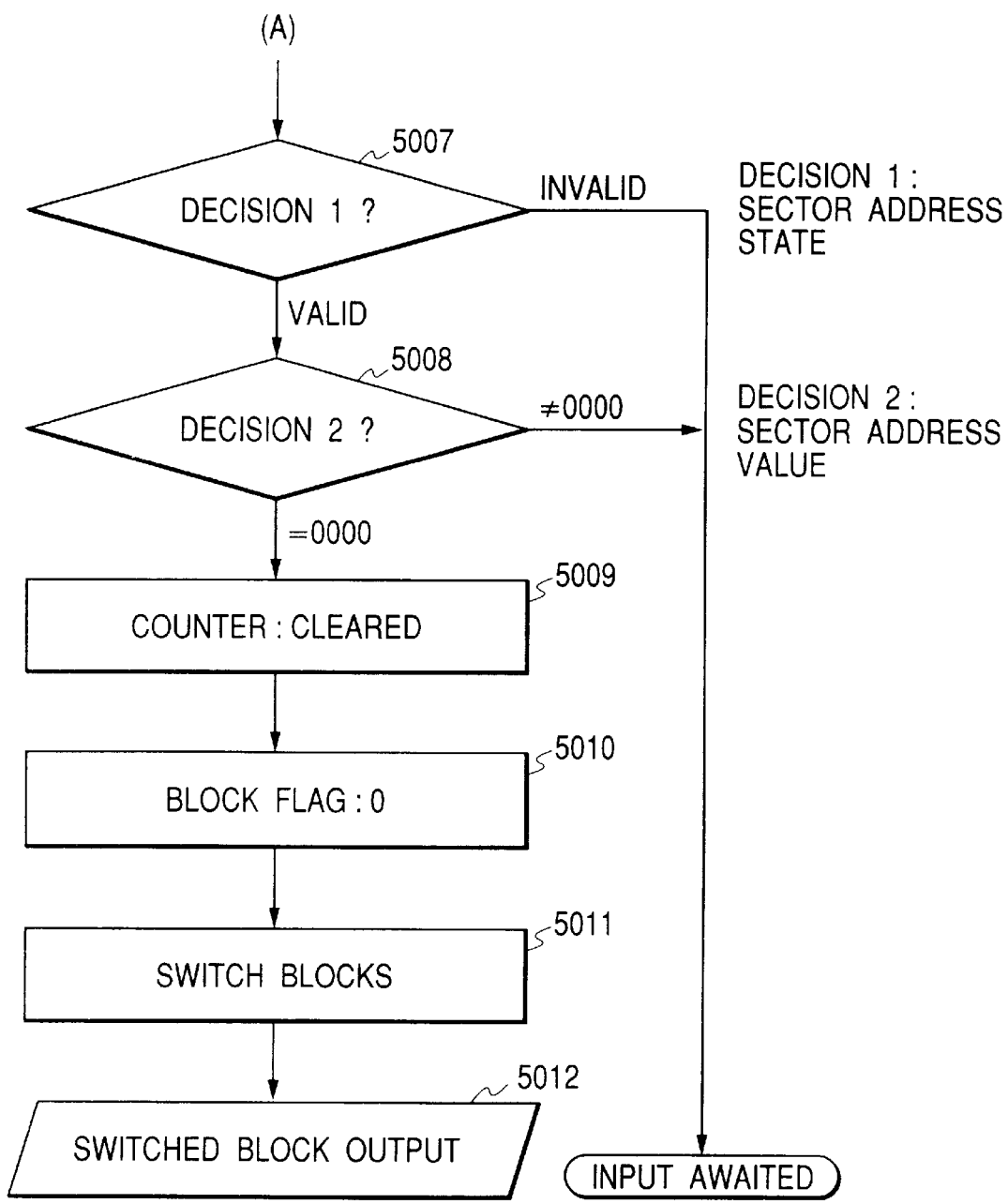
FIG. 32 is another flowchart of steps effected by the block top detecting means.
Figure 33:
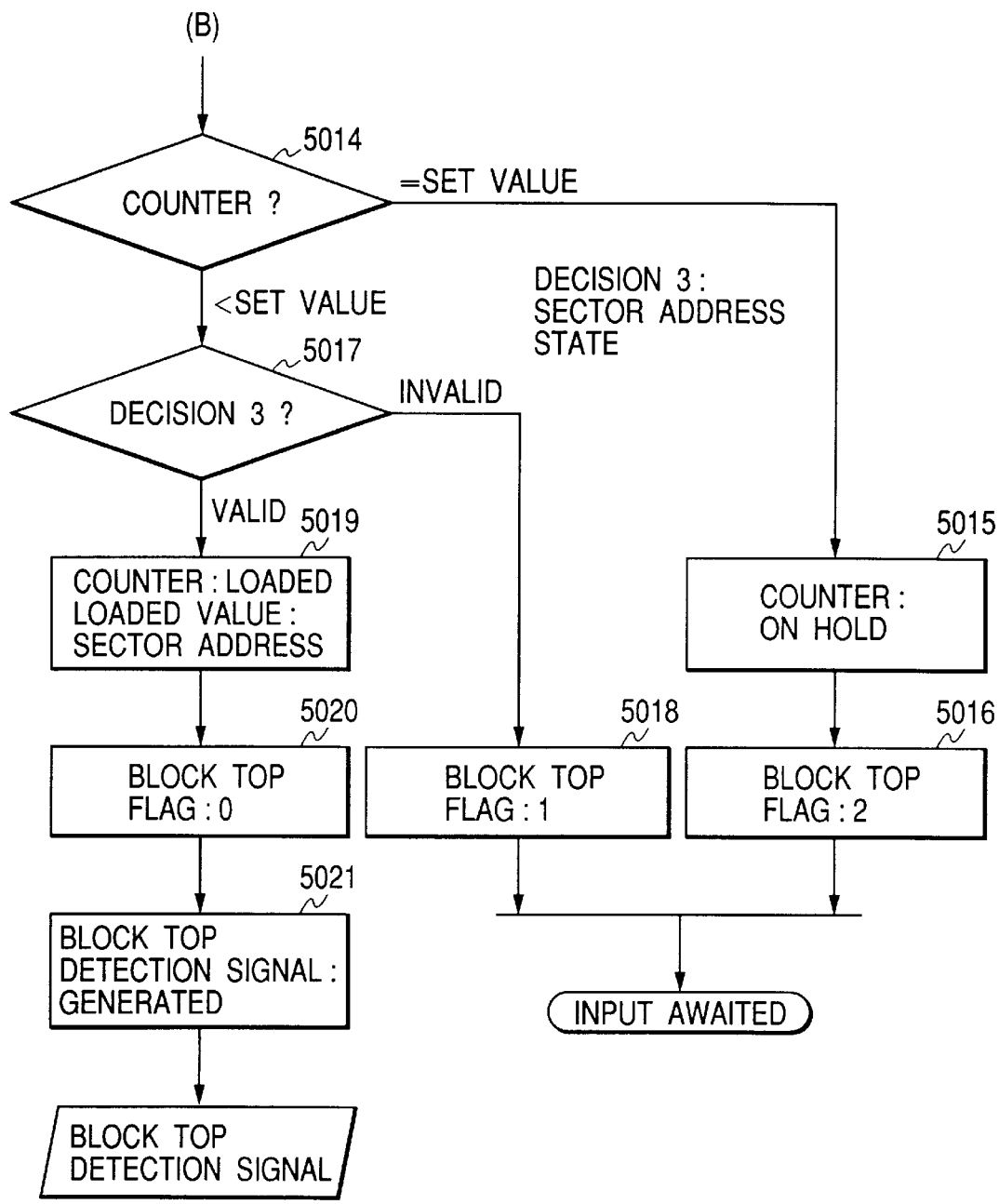
FIG. 33 is another flowchart of steps effected by the block top detecting means.

Block top detecting operations by the circuits involved will now be described with reference to FIGS. 31, 32 and 33. These figures are flowcharts of steps carried out by the block top detecting means 114 shown in FIG. 30. In step 5002 of FIG. 31, the decision decoder 502 latches the sector address 111 and sector address state 112 generated by the sector address detecting means 110. In step 5003, the block top flag is decided. If the value of the block top flag is decided to be 2, (A) in FIG. 32 is reached; if the block top flag value is found to be 0 or 1, step 5004 is reached in which the counter 503 is incremented by 1. In step 5005, the counter value is decided. The counter 503 counts the number of sectors in a block and starts being incremented once a block top is detected. If the value of the counter 503 is less than 16, the input of the next sector address is awaited (step 5005).

If the counter takes a value of 16 or greater, step 5006 is reached. Because each block of normal data is made up of 16 sectors, a block top is decided to be reached when the counter has exactly the value of 16. In this case, step 5006 is followed by (A) in FIG. 32. If the counter has a value of 17 or greater, control is passed on to (B) in FIG. 33.

The steps subsequent to (A) in FIG. 32 will now be described. In step 5007, the sector address state is decided. If the sector address state is decided to be invalid, the next input is awaited; if the state is found to be valid, the next step is reached (i.e., step 5008). In step 5008, the value of the detected sector address 111 is decided. Because each block is composed of 16 sectors, the low-order four bits of the sector address within a block vary from 0000b to 1111b in binary notation. Thus the low-order four bits in the sector address of a block top are 0000b. If the value of the detected sector address 111 is other than 0000b, i.e., something other than the value indicating a block top (step 5008), then the next input is waited. If the detected sector address 111 takes the value of 0000b, the next step (step 5009) is reached. That is, the next step is reached when the sector address state 112 is valid and the sector address is 0000b, i.e., when a block top is detected. With a block top detected, the counter 503 is reset in step 5009. In step 5010, the block top flag deciding means 510 sets the block top flag to 0. In step 5011, the decoder 502 detects a block top. In step 5012, a block top detection signal 11 is output.

The steps subsequent to (B) in FIG. 33 will now be described. Transition to (B) in FIG. 33 occurs when the counter 503 takes a value of 17 or greater instep 5006, i.e., when no block top is detected. In step 5014, the value of the counter 503 is compared with the block top non-detection set value 501. If the counter value matches the set value 501, the counter 503 is put on hold in step 5015, the block top flag is set to 2 in step 5016, and the next input is awaited.

If the value of the counter 503 is less than the set value 501 in step 5014, then step 5017 is reached in which the sector address state 112 is decided. If the sector address state 112 is decided to be invalid, the block top flag is set to 1 (step 5018) and the next input is awaited. If the sector address state 112 is decided to be valid in step 5017, the detected sector address 111 is loaded to the counter (step 5019), the block top flag is set to 0 (step 5020), a block top is detected (step 5021), and a block top detection signal 11 is output (step 5022). If no block top is detected here, a block top detection signal will be output when the next valid sector address is input, i.e., when a subsequent sector top is detected. If the sector address state is found to be invalid, the block top flag deciding means sets the block top flag to 1 using the flag control signal, and the next input is awaited.

When the above scheme is adopted, continuously detected signals are used as the basis for detecting block tops unfailingly. With error correction start signals generated precisely, the demodulating means is allowed to control blocks. The detecting means switches the continuous detection and non-detection count set values so as to detect block tops through extrapolation. Thus block tops of only error-free data are detected, and error correction start signals are generated accurately.

Figure 34:
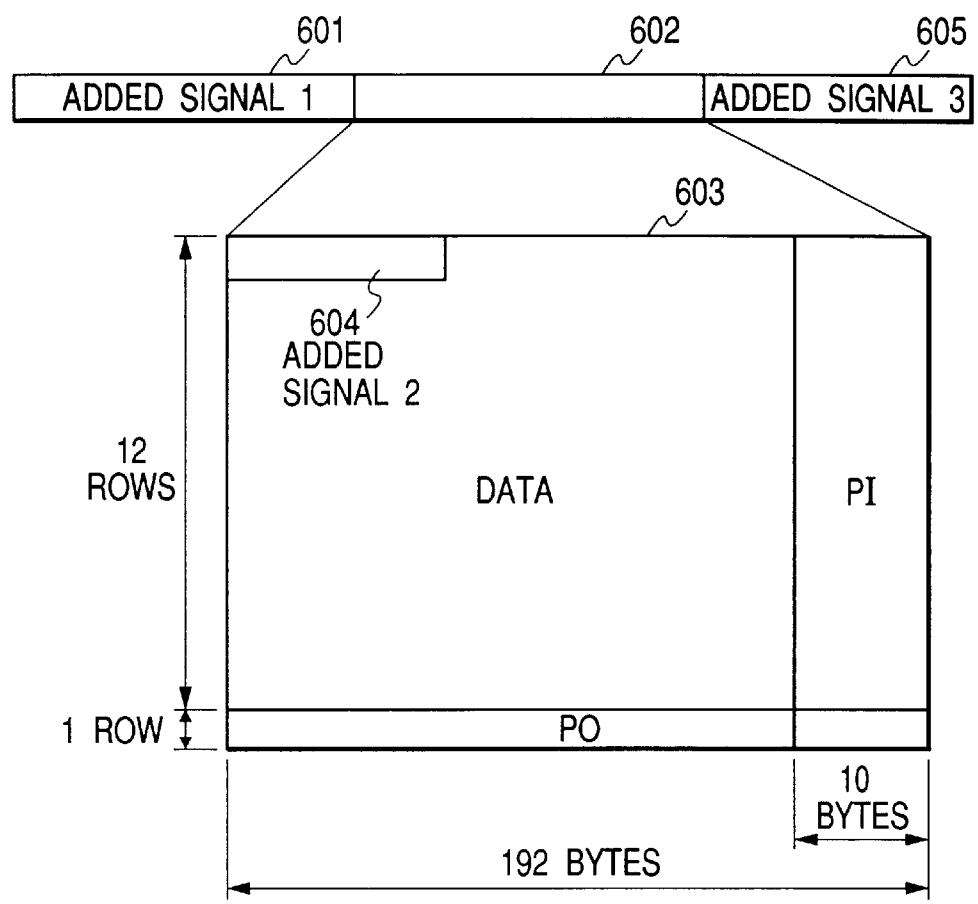
FIG. 34 is a schematic view of a data format.
Figure 35:
FIG. 35 is a schematic view showing a structure of added data 1.
Figure 36:
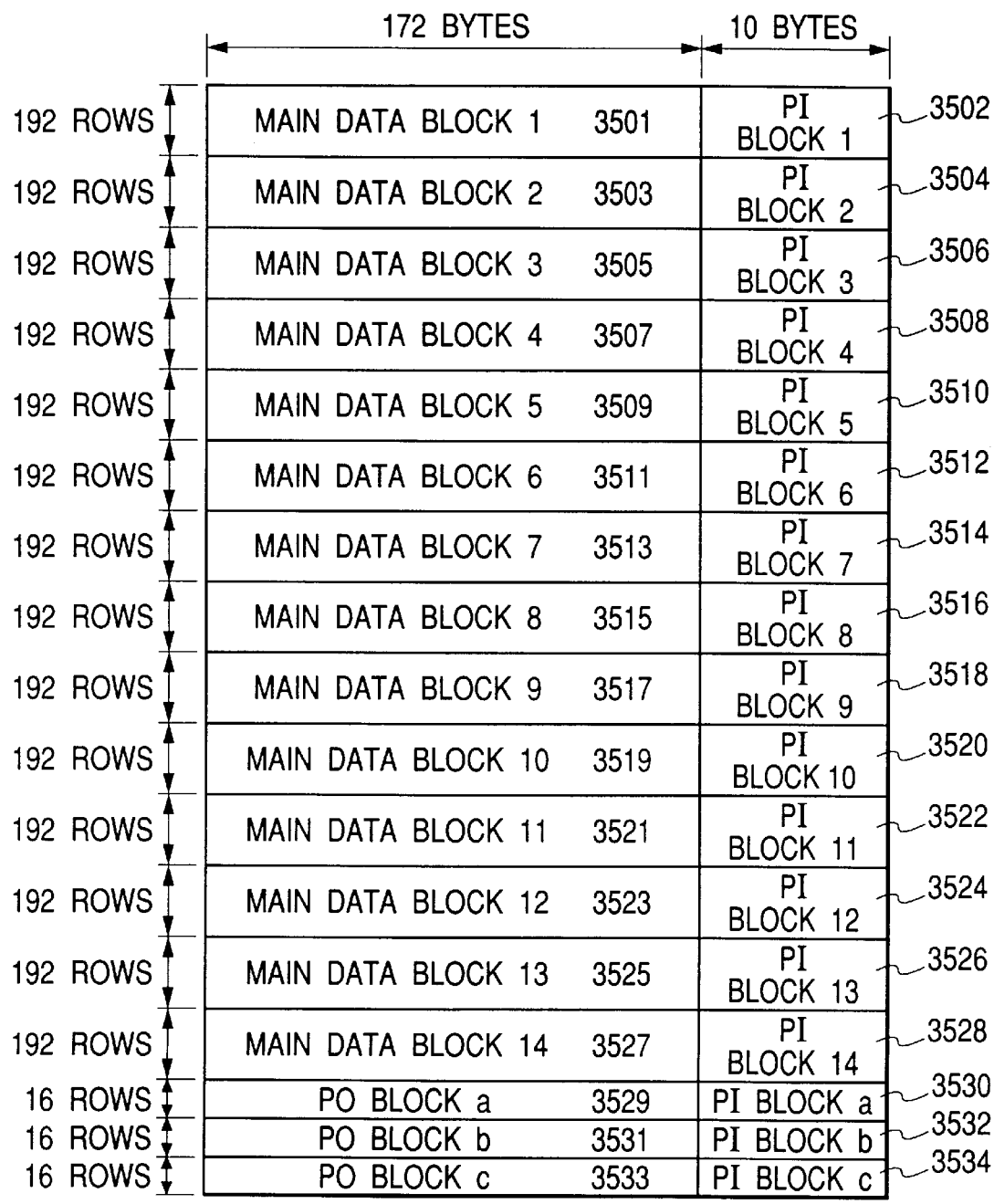
FIG. 36 is a view showing a detailed RAM map.

The input of data in the format of FIG. 34 will now be described. In FIG. 34, reference numeral 601 stands for added data 1, 602 for a data area, and 603 for a format of data held in the data area 602. The format 603 is a sector structure of FIG. 5 supplemented by added data, by a row-direction error correction code PO attached to main data, and by a column-direction error correction code PI attached to the added data, main data and PO. Reference numeral 604 stands for added data 2 whose structure is the same as the ID structure in FIG. 7, and 605 denotes added data 3. FIG. 35 shows a typical structure of the added data 1 (601). Reference numeral 701 stands for a sector number and 702 for a synchronizing signal. It is assumed here that data are input continuously in the formats shown in FIGS. 34 and 36.

The data shown in FIGS. 34 and 35 are controlled by sector numbers 701 included in the structure of added data 1 in FIG. 35. When a block top is detected by use of a sector number 701, the sector address in the ID structure of FIG. 7 is cleared to 0. The data are then set with the sector address incremented successively. The data together with the sector address are input to the demodulating means 8 shown in FIG. 1. The demodulating means 8 performs the same detecting operations as those carried out on the input data shown in FIGS. 5 and 6. The block top detecting means 114 in FIG. 12 detects a block top using the sector address 111 and sector address state 112. Where data are input in the format of FIG. 34, the block top detecting means 114 may enter a mode in which the decision of the sector address state in step 5007 of FIG. 32 is ignored so that only the decision in step 5007 will be performed to detect a block top.

In the manner described, where a sector with its sector address 114 other than 0000b is regarded actually as a block top, it is still possible to generate a block top detection signal 11. It follows that if data are input intermittently as shown in FIGS. 34 and 35, block top detection signals 11 are still generated reliably and accurately. The data formats shown in FIGS. 34 and 35 are not limitative of the invention; whenever data are reproduced intermittently from the storage medium, the steps described above may be used to acquire block top detection signals 11 from reproduced signals in a reliable and precise manner.

Figure 9:
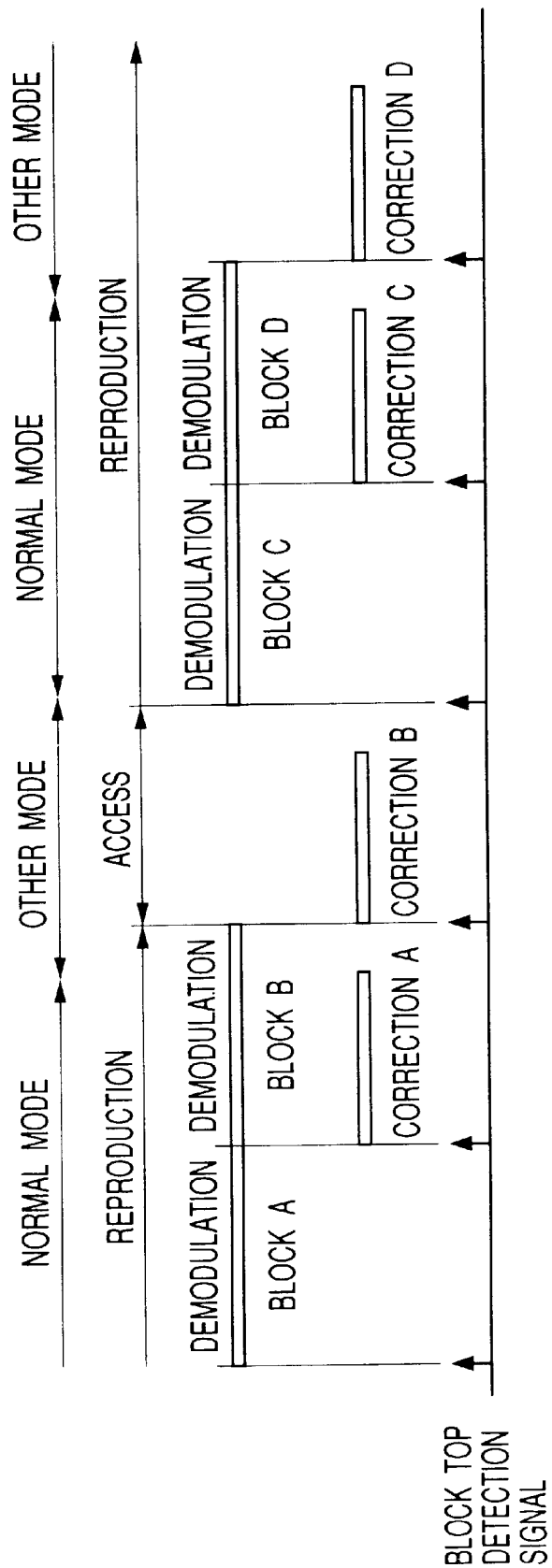
FIG. 9 is a graphic representation illustrating relations between the time required for demodulation and the time for error correction upon input of an access signal.

The RAM map of the RAM 12 shown in FIG. 4 will now be described in more detail. In a detailed RAM map of FIG. 36, 16 blocks of data are stored temporarily as in the example of FIG. 4. The data in each of the 16 blocks have the structure of FIG. 6. As with the case in FIG. 4, one block of data is initially written to the RAM 12. It is assumed that data are written from address 0000 in FIG. 4 onward. Of the data constituting a single block, the main data are written to an area 3501 of a main data block 1, the PI code attached to the main data is written to an area 3502 of a PI code block 1, the PO code attached to the main data is written to an area 3529 of a PO code block "a," and the PI code attached to the PO code is written to an area 3530 of a PI code block "a." As described earlier in conjunction with FIG. 4, the demodulation of the next block is started simultaneously with the error correction of the current block. Specifically, of the demodulated data in the next block, the main data are written to an area 3503 of a main data block 2, the PI code attached to the main data is written to an area 3504 of a PI code block 2, the PO code attached to the main data is written to an area 3531 of a PO code block "b," and the PI code attached to the PO code is written to an area 3532 of a PI code block "b." Error correction is performed on the data in the areas 3501, 3502, 3529 and 3530. It is assumed here that the time required for correcting one block for errors is shorter than the time for demodulating one block. The next demodulated data are written to areas 3505, 3506, 3533 and 3534 of blocks 3 and "c" while error correction is performed simultaneously on the areas 3503, 3504, 3531 and 3532 of the blocks 2 and "b." When the next data are demodulated, they are written to areas of blocks 4 and "a" while error correction is carried out on the data in the blocks 3 and "c," and so on. Given one block of data, as described, the PO code and the PI code attached to the PO code are processed by use of a ring-type buffer arrangement (areas 3529 through 3534), a process described earlier in connection with FIG. 4. The main data and the PI code attached thereto are processed using a ring-type buffer arrangement (areas 3501 through 3528) for 14 blocks, another process discussed earlier in conjunction with FIG. 4. Because the areas for accommodating the PO code and the PI code attached thereto are small, the two codes can be written over by subsequently entered demodulated data after error correction and before a data output to the outside. This, however, poses no problem since only the main data need to be sent to the outside and the PI and PO codes are no longer needed after error correction. Although 14 blocks are allocated to the PI area in the RAM map of FIG. 36, three blocks may be set aside alternatively (e.g., 3502, 3504 and 3506 alone) for the reasons above. Such an alternative, however, would require drastically changing the order of data retrieval through demodulation and the sequence of addresses. With three blocks allocated to the PO code and with the PI code attached to the PO code, uncorrected data in the PO and PI code areas will not be overwritten immediately by the demodulated data thanks to a one-block redundancy. If the demodulation of some blocks is temporarily executed more quickly than the correction of blocks, the correction is carried out uninterruptedly for several blocks until it catches up with the demodulation that has return to its normal rate after the temporary acceleration, so that the one-block redundancy is again restored. In FIG. 9, if the time for demodulating block C is shorter than the time for error correction of block B, the correction of block C is started simultaneously with the end of the correction of block B. When the correction of block C ends before the start of the demodulation of block E, the one-block redundancy is restored. In this manner, a premature switching of blocks caused by a demodulating circuit malfunction does not pose problems. In addition, there is no problem even if a delay in motor control upon access has caused a temporary surge in the input frequency.

Access-related operations will now be described. FIG. 9 is a graphic representation illustrating relations between the time required for demodulation and the time for error correction upon input of an access signal. In FIG. 9, each portion marked "DEMODULATION" represents the time it takes to carry out demodulation. A marking "CORRECTION" denotes the time required for error correction. A marking it "REPRODUCTION" indicates a state in which data are reproduced through demodulation or error correction. A marking "ACCESS" represents a state in which data recorded on the storage medium are accessed not in the order in which they were written but in a random fashion. Specifically, the access state is a state where the pickup is moving over the storage medium. In the access state, blocks are not demodulated and an input of target data is awaited. In the example of FIG. 9, an access state is reached upon completion of the demodulation of block B. In the access state following the demodulation of block B, demodulation cannot be performed because no data are input. The start of error correction is timed to a block top detection signal generated when the top of the next block to be demodulated is detected. During normal access, there is no input of data to be demodulated, hence no block top detection signal generated and no error correction performed.

Figure 10:
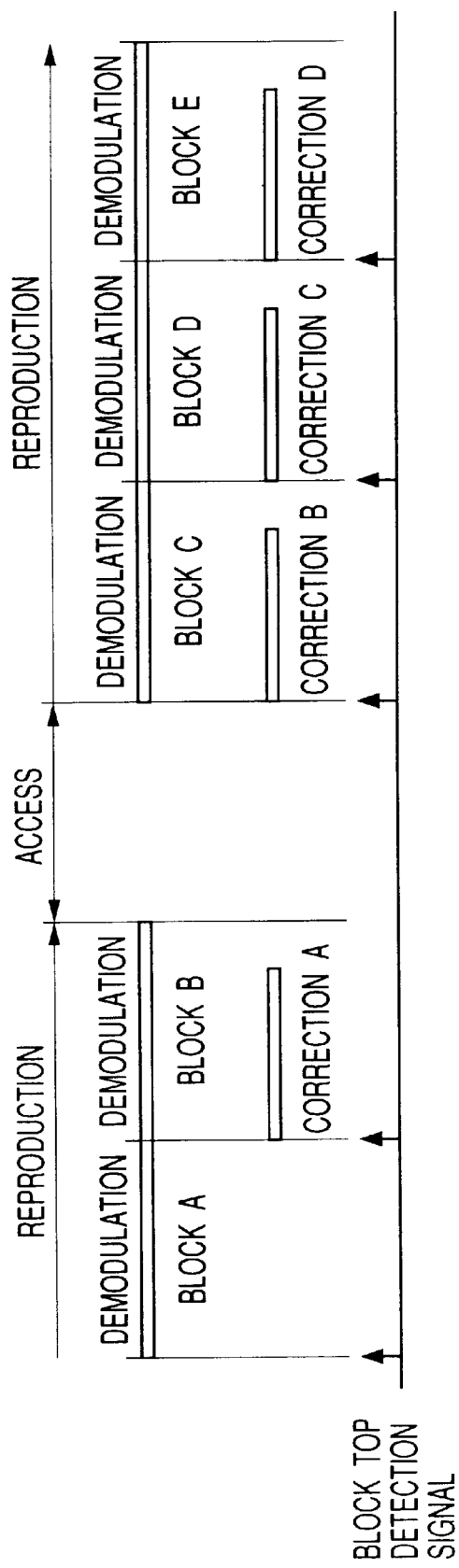
FIG. 10 is a graphic representation sketching relations between the time required for demodulation and the time for error correction upon input of an access signal in a new mode.

FIG. 10 shows graphically relations between the time required for demodulation and the time for error correction where error correction is also carried out during access with a new mode established. At access time and upon demodulation of final data, the microcomputer generates a signal representing such instances. When detecting the microcomputer-generated signal, the demodulating means inserts a block top detection signal at the end of the final data. On detecting the inserted block top detection signal, the error correcting means starts error correction.

The addition of the new mode above allows error correction to be carried out during access. This makes it possible to accelerate output where small quantities of data are accessed randomly for data reproduction.

As described and according to the invention, demodulation is carried out in synchronism with the input data rate. Error correction is performed by use of a fixed frequency clock signal. The time required for error correction is shorter than the time for demodulation in effect upon data reproduction at a maximum linear velocity. These features permit error correction to proceed unaffected by demodulation even where data are not read, whereby the reliability of the system is enhanced.

As many apparently different embodiments of this invention may be made without departing from the spirit and scope thereof, it is to be understood that the invention is not limited to the specific embodiments thereof except as defined in the appended claims.

What is claimed is:

1. A disk data reproducing apparatus comprising:

disk signal detecting means for detecting signals from a disk accommodating data which are divided in units of h bytes, h being a natural number, into sectors each identified by an address attached thereto, said sectors being grouped into blocks each comprised of a plurality of sectors and furnished with an error correction code, said data being further divided in units of i bytes, i being a natural number, into frames each provided with a synchronizing signal, the frame data having being modulated and recorded on said disk;

synchronizing signal detecting means for detecting said synchronizing signal from the detected signal;

demodulating means for performing data demodulation based on modulation rules;

storing means for temporarily storing demodulated data;

error correcting means for correcting errors in the temporarily stored data;

data outputting means for outputting the data having undergone error correction;

block top detecting means for detecting a block top based on the detected synchronizing signal; and error correction start signal generating means for generating an error correction start signal when said block top detecting means detects said block top.

2. A disk data reproducing apparatus according to claim 1, wherein said error correcting means starts error correction in accordance with said error correction start signal.

3. A disk data reproducing apparatus according to claim 1, wherein said error correcting means invalidates any error correction start signal during error correction.

4. A disk data reproducing apparatus according to claim 1, wherein said data were recorded on said disk at a constant linear velocity, and wherein the time required for error correction of one block by said error correcting means is shorter than the time for error correction of one block in effect when data reproduction is carried out at a maximum linear velocity which may be established constantly and independent of a linear velocity for data reproduction.

5. A disk data reproducing apparatus according to claim 1, wherein said synchronizing signal detecting means includes:

detection deciding means for deciding whether synchronizing signals are detected continuously at least over a predetermined period;

transmission start signal generating means for generating a transmission start signal depending on the decision by said detection deciding means;

non-detection deciding means for deciding whether synchronizing signals are not detected continuously at least over a predetermined period; and transmission stop signal generating means for generating a transmission stop signal depending on the decision by said non-detection deciding means; and wherein said storing means for temporarily storing the demodulated data includes data transmission starting and stopping means for starting and stopping data transmission in accordance with said transmission start signal and said transmission stop signal.

6. A disk data reproducing apparatus according to claim 1, further comprising:

address latching means for latching the identifying address in accordance with the frame position;

deciding means for deciding whether said identifying address has any error;

transmission start signal generating means for generating a transmission start signal when said deciding means detects no error continuously at least over a predetermined period; and transmission stop signal generating means for generating a transmission stop signal when said deciding means detects errors continuously at least over a predetermined period;

wherein said storing means includes data transmission starting and stopping means for starting and stopping data transmission in accordance with said transmission start signal and said transmission stop signal.

7. A disk data reproducing apparatus according to claim 1, wherein said block top detecting means includes:

timing signal generating means for generating a timing signal for detecting the identifying address;

identifying address latching means for latching said identifying address in accordance with said timing signal generated by said timing signal generating means;

error deciding means for deciding whether said identifying address has any error;

block top deciding means for deciding whether the latched identifying address represents a block top;

undetected period deciding means for deciding whether a block top is not detected over a predetermined period; and block top establishing means for regarding detection of an error-free identifying signal as a block top when the period in which said undetected period deciding means has not detected a block top is decided to be less than said predetermined period.

8. A disk data reproducing apparatus at least comprising:

demodulating means for demodulating in accordance with modulation rules signals from a disk accommodating data which are divided in units of h bytes, h being a natural number, into blocks each identified by an address attached thereto and furnished with an error correction code, said data being further divided in units of i bytes, i being a natural number, into frames each provided with a synchronizing signal, the frame data having being modulated and recorded on said disk;

error correcting means for correcting errors of the demodulated data;

two counters, one of said two counters being incremented by a signal generated by said demodulating means indicating detection of a block top, the other counter being incremented by a signal generated by said error correcting means indicating an end of error correction of a single block; and comparing means for comparing values of said two counters.

9. A disk data reproducing apparatus at least comprising:

demodulating means for demodulating in accordance with modulation rules signals from a disk accommodating data which are divided in units of h bytes, h being a natural number, into blocks each identified by an address attached thereto and furnished with an error correction code, said data being further divided in units of i bytes, i being a natural number, into frames each provided with a synchronizing signal, the frame data having being modulated and recorded on said disk;

storing means for temporarily storing demodulated data;

error correcting means for correcting errors of the temporarily stored data;

number pattern assigning means for assigning a number pattern to predetermined n types of synchronizing signals, n being a natural number, in accordance with predetermined data arrangements;

intra-sector frame position obtaining means for obtaining the position of a given frame to which said number pattern is assigned by said number pattern assigning means;

detection deciding means for deciding whether the assigned number pattern is a valid number pattern;

continuous detection deciding means for deciding whether synchronizing signals are detected continuously at least over a predetermined period in accordance with the decision by said detection deciding means;

transmission start signal generating means for generating a transmission start signal depending on the decision by said continuous detection deciding means;

continuous non-detection deciding means for deciding whether synchronizing signals are not detected continuously at least over a predetermined period in accordance with the decision by said detection deciding means; and transmission stop signal generating means for generating a transmission stop signal in accordance with the decision by said continuous non-detection deciding means; and wherein said storing means includes data transmission starting and stopping means for starting and stopping data transmission in accordance with said transmission start signal and said transmission stop signal.

10. A disk data reproducing apparatus according to claim 9, wherein said number pattern is an array of numbers assigned to h continuous frames, h being a natural number.

11. A disk data reproducing apparatus according to claim 9, wherein, if the period in which synchronizing signals are not detected is more than said predetermined period, the frame position is advanced by one frame at normal frame intervals.

12. A disk data reproducing apparatus at least comprising:

demodulating means for demodulating in accordance with modulation rules signals from a disk accommodating data which are divided in units of h bytes, h being a natural number, into blocks each identified by an address attached thereto and furnished with an error correction code, said data being further divided in units of i bytes, i being a natural number, into frames each provided with a synchronizing signal, the frame data having being modulated and recorded on said disk;

storing means for temporarily storing demodulated data;

error correcting means for correcting errors of the temporarily stored data;

number pattern assigning means for assigning a number pattern to predetermined n types of synchronizing signals, n being a natural number, in accordance with predetermined data arrangements;

intra-sector frame position obtaining means for obtaining the position of a given frame to which said number pattern is assigned by said number pattern assigning means;

detection deciding means for deciding whether the assigned number pattern is a valid number pattern;

continuous detection deciding means for deciding whether synchronizing signals are detected continuously at least over a predetermined period in accordance with the decision by said detection deciding means;

continuous non-detection deciding means for deciding whether synchronizing signals are not detected continuously at least over a predetermined period in accordance with the decision by said detection deciding means; and transmission stop signal generating means for generating a transmission stop signal in accordance with the decision by said continuous non-detection deciding means.

13. A disk data reproducing apparatus at least comprising:

demodulating means for demodulating in accordance with modulation rules signals from a disk accommodating data which are divided in units of h bytes, h being a natural number, into blocks each identified by an address attached thereto and furnished with an error correction code, said data being further divided in units of i bytes, i being a natural number, into frames each provided with a synchronizing signal, the frame data having being modulated and recorded on said disk;

storing means for temporarily storing demodulated data;

error correcting means for correcting errors of the temporarily stored data;

deciding means for deciding whether the identifying address has any error in accordance with parity data attached to the address; and address correcting means for correcting any erroneous identifying address by use of said parity data code attached to the address.

14. A disk data reproducing apparatus at least comprising:

demodulating means for demodulating in accordance with modulation rules signals from a disk accommodating data which are divided in units of h bytes, h being a natural number, into sectors each identified by an address attached thereto and furnished with an error correction code, said sectors being grouped into blocks each comprised of a plurality of sectors and furnished with an error correction code, said data being further divided in units of i bytes, i being a natural number, into frames each provided with a synchronizing signal, the frame data having being modulated and recorded on said disk;

error correcting means for correcting errors of the demodulated data;

error deciding means for detecting the identifying address in accordance with the frame position so as to decide whether said identifying address has any error based on the error correction code attached to the address;

detection deciding means for deciding as detection an instance in which said error deciding means decides said identifying address to have no error;

continuous detection deciding means for deciding whether instances of detection decided by said detection deciding means are continued at least over a predetermined period;

non-detection deciding means for deciding as non-detection an instance in which said error deciding means decides said identifying address to have an error; and continuous non-detection deciding means for deciding whether instances of non-detection decided by said non-detection deciding means are continued at least over a predetermined period.

15. A disk data reproducing apparatus comprising:

signal detecting means for detecting signals from a disk accommodating data which are divided in units of h bytes, h being a natural number, into blocks each identified by an address attached thereto and furnished with an error correction code, said data being further divided in units of i bytes, i being a natural number, into frames each provided with a synchronizing signal, the frame data having been modulated and intermittently recorded on said disk;

demodulating means for performing data demodulation in accordance with modulation rules;

storing means for temporarily storing demodulated data;

error correcting means for correcting errors of the temporarily stored data;

data outputting means for outputting the data having undergone error correction; and block top detecting means for detecting a block top based on the detected synchronizing signal, said block top detecting means further including:

timing signal generating means for generating a timing signal for detecting the identifying address;

identifying address latching means for latching said identifying address in accordance with said timing signal generated by said timing signal generating means;

error deciding means for deciding whether said identifying address has any error;

error and block top deciding means for deciding whether the latched identifying address has no error and represents a block top;

non-detection deciding means for deciding whether no block top is detected over a predetermined period; and decision invalidating means for invalidating the decision made by said error deciding means.

16. A disk data reproducing apparatus for reproducing data from a disk medium on which said data are recorded either intermittently or continuously, said disk data reproducing apparatus comprising:

data continuity deciding means for deciding whether said data are recorded intermittently or continuously on said disk medium; and block top detecting means for detecting a block top based on synchronizing signals detected, said block top detecting means further including:

timing signal generating means for generating a timing signal for detecting an identifying address;

identifying address latching means for latching said identifying address in accordance with said timing signal generated by said timing signal generating means;

error deciding means for deciding whether said identifying address has any error;

error and block top deciding means for deciding whether the latched identifying address has no error and represents a block top;

non-detection deciding means for deciding whether no block top is detected over a predetermined period; and decision validity switching means for rendering either valid or invalid the decision made by said error deciding means, in accordance with the decision made by said data continuity deciding means.

17. A disk data reproducing apparatus comprising:

signal detecting means for detecting signals from a disk accommodating data which are divided in units of h bytes, h being a natural number, into sectors each identified by an address attached thereto, said sectors being grouped into matrixes each having row-direction data supplemented by a second error correction code, each of said matrixes further having column-direction data and said second error correction code supplemented by a first error correction code so as to constitute a block, said data further being provided with a synchronizing signal in units of columns to constitute frames, the frame data having been modulated and recorded on said disk;

synchronizing signal detecting means for detecting said synchronizing signal from the detected signal;

demodulating means for performing data demodulation based on modulation rules;

storing means for temporarily storing demodulated data;

error correcting and data rewriting means for correcting errors in the temporarily stored data and rewriting the corrected data to said storing means; and data outputting means for outputting from said storing means the data having undergone error correction;

wherein said storing means has areas for n blocks, n being a natural number, for accommodating data and said first error correction code attached to the data, and areas for other blocks for accommodating said second correction code attached to the accommodated data and said first correction code attached to said second correction code, said other blocks being more than three blocks and fewer than said n blocks.

18. A disk data reproducing apparatus comprising:

signal detecting means for detecting signals from a disk accommodating data which are divided in units of h bytes, h being a natural number, into sectors each identified by an address attached thereto, said sectors being grouped into matrixes each having row-direction data supplemented by a second error correction code, each of said matrixes further having column-direction data and said second error correction code supplemented by a first error correction code so as to constitute a block, said data further being provided with a synchronizing signal in units of columns to constitute frames, the frame data having been modulated and recorded on said disk;

synchronizing signal detecting means for detecting said synchronizing signal from the detected signal;

demodulating means for performing data demodulation based on modulation rules;

storing means for temporarily storing demodulated data;

error correcting and data rewriting means for correcting errors in the temporarily stored data and rewriting the corrected data to said storing means; and data outputting means for outputting from said storing means the data having undergone error correction;

wherein said storing means has areas for n blocks, n being a natural number, for accommodating data, and areas for other blocks for accommodating said second and said first correction codes attached to the data held in the data areas, said other blocks being more than three blocks and fewer than said n blocks.

19. A disk data reproducing method comprising the steps of:

having a pickup detect signals from a disk accommodating data which are divided in units of h bytes, h being a natural number, into blocks each identified by an address attached thereto and furnished with an error correction code, said data being further divided in units of i bytes, i being a natural number, into frames each provided with a synchronizing signal, the frame data having been modulated and recorded on said disk;

demodulating the detected signals based on modulation rules;

temporarily storing the demodulated data in storing means; and correcting errors of the temporarily stored data;

wherein exists normally a relationship defined as a reproduction time 2 being longer than an error correction time which in turn is longer than a reproduction time 1, where said reproduction time 1 is the time required to reproduce one block of data at a maximum linear velocity that may be set continuously, and said reproduction time 2 is the time required to reproduce one block of data at a maximum linear velocity which occurs temporarily until predetermined steady motor revolutions are reached; and wherein, if it happens that said reproduction time 1 is longer than an error correction time which in turn is longer than said reproduction time 2, then two processes are performed repeatedly, one of said two processes being one in which k blocks of demodulated data, k being a natural number, are written to said storing means before data demodulation is halted temporarily, the other process being one in which said pickup is moved over said disk to resume reproduction of data from a disk location where data demodulation was halted temporarily.

20. A disk data reproducing method comprising the steps of:

demodulating in accordance with modulation rules signals from a disk accommodating data which are divided in units of h bytes, h being a natural number, into blocks each identified by an address attached thereto and furnished with an error correction code, said data being further divided in units of i bytes, i being a natural number, into frames each provided with a synchronizing signal, the frame data having being modulated and recorded on said disk;

correcting errors of the demodulated data;

detecting said synchronizing signal from said demodulated data;

obtaining the position of a given frame inside one of sectors which are units constituting each of said blocks;

detecting a sector top based on the obtained frame position;

deciding whether the detected sector top represents a block top on the basis of the address of said detected sector top; and generating an error correction start signal if a block top is detected.

21. A disk data reproducing method according to claim 20, wherein said error correcting step starts error correction in accordance with said error correction start signal.

22. A disk data reproducing method according to claim 20, wherein said error correcting step invalidates said error correction start signal during error correction.

* * * * *